(12) United States Patent
Nagahama

(10) Patent No.: US 10,749,405 B2
(45) Date of Patent: Aug. 18, 2020

(54) POWER TOOL

(71) Applicant: MAKITA CORPORATION, Anjo-shi, Aichi (JP)

(72) Inventor: Tatsuya Nagahama, Anjo (JP)

(73) Assignee: MAKITA CORPORATION, Anjo-Shi (JP)

( * ) Notice: Subject to any disclaimer, the term of this patent is extended or adjusted under 35 U.S.C. 154(b) by 150 days.

(21) Appl. No.: 15/978,467

(22) Filed: May 14, 2018

(65) Prior Publication Data
US 2019/0006909 A1 Jan. 3, 2019

(30) Foreign Application Priority Data

Jul. 3, 2017 (JP) .................. 2017-130586

(51) Int. Cl.
*H02K 5/22* (2006.01)
*H02K 7/14* (2006.01)
*B25D 11/00* (2006.01)
*H02K 11/21* (2016.01)
*B25D 16/00* (2006.01)
(Continued)

(52) U.S. Cl.
CPC ........... *H02K 5/225* (2013.01); *B25D 16/006* (2013.01); *B25D 17/00* (2013.01); *B25F 5/008* (2013.01); *B25F 5/02* (2013.01); *H02K 3/50* (2013.01); *H02K 7/145* (2013.01); *H02K 11/21* (2016.01); *H02K 29/06* (2013.01); *B25D 2216/0084* (2013.01); *B25D 2250/095* (2013.01); *B25D 2250/121* (2013.01); *B25D 2250/145* (2013.01); *B25D 2250/221* (2013.01); *B25D 2250/265* (2013.01); *H02K 9/06* (2013.01); *H02K 2211/03* (2013.01)

(58) Field of Classification Search
CPC .. B25D 11/064; B25D 16/006; H02K 11/215; H02K 5/225; H02K 7/145; H02K 29/06; B25F 5/02; B25F 5/008
USPC .............................................. 310/50, 71, 194
See application file for complete search history.

(56) References Cited

U.S. PATENT DOCUMENTS 7,064,462 B2 * 6/2006 Hempe .................. B23D 45/16
173/217
7,166,948 B2 * 1/2007 Petersen .................. H02K 3/28
310/179
(Continued)

FOREIGN PATENT DOCUMENTS

JP 2015-056953 A 3/2015
WO 2014080675 * 5/2014 ............. H02K 11/00

OTHER PUBLICATIONS

English machine translation, Urabe et al. WO 2014-080675 (Year: 2014).*

*Primary Examiner* — Burton S Mullins
(74) *Attorney, Agent, or Firm* — Oliff PLC

(57) ABSTRACT

Provided is a power tool whereby reduction is made for time-consuming effort and cost required in trouble, inspection and so forth related to a motor. A hammer drill, which is an example of a power tool, includes a plurality of coils, an insulator holding the plurality of coils, a terminal unit that is electrically connected to the plurality of coils and is attached to the insulator, a rotor that is rotatable with respect to the insulator, and a sensor board that detects rotation of the rotor and is attached to the terminal unit. The sensor board is detachable from the terminal unit, while the terminal unit is attached to the insulator.

10 Claims, 13 Drawing Sheets

(51) Int. Cl.
    *H02K 29/06*     (2006.01)
    *H02K 3/50*     (2006.01)
    *B25F 5/02*     (2006.01)
    *B25F 5/00*     (2006.01)
    *B25D 17/00*     (2006.01)
    *H02K 9/06*     (2006.01)

(56) References Cited

U.S. PATENT DOCUMENTS

| | | | | |
|---|---|---|---|---|
| 7,242,125 | B2 * | 7/2007 | Schneider | H02K 3/345 |
| | | | | 310/194 |
| 7,498,702 | B2 * | 3/2009 | Migita | H02K 3/522 |
| | | | | 310/43 |
| 7,663,274 | B2 * | 2/2010 | Kataoka | H02K 3/522 |
| | | | | 310/68 R |
| 7,663,277 | B2 * | 2/2010 | Kinoshita | H02K 3/522 |
| | | | | 310/68 B |
| 7,737,587 | B2 * | 6/2010 | Kataoka | H02K 3/522 |
| | | | | 310/71 |
| 8,890,380 | B2 * | 11/2014 | Andrieux | H02K 3/522 |
| | | | | 310/68 B |
| 9,048,699 | B2 * | 6/2015 | Oomori | H02K 11/33 |
| 9,148,043 | B2 * | 9/2015 | Jang | G01P 1/026 |
| 9,450,471 | B2 * | 9/2016 | Mergener | B25B 21/02 |
| 9,948,162 | B2 * | 4/2018 | Nagahama | H02K 29/08 |
| 2006/0097590 | A1 * | 5/2006 | Schill | H02K 3/522 |
| | | | | 310/71 |
| 2013/0207491 | A1 * | 8/2013 | Hatfield | H02K 3/522 |
| | | | | 310/50 |
| 2015/0069864 | A1 | 3/2015 | Nagahama et al. | |

\* cited by examiner

POWER TOOL

CROSS-REFERENCE TO RELATED APPLICATIONS

This application claims the benefit of priority to Japanese Patent Application No. 2017-130586, filed on Jul. 3, 2017, the entire contents of which are hereby incorporated by reference.

BACKGROUND

1. Technical Field

The present invention relates to a power tool such as a hammer drill.

2. Description of the Background

A type of hammer drill including a brushless motor has been known as described in Japan Laid-open Patent Application Publication No. 2015-56953 (hereinafter referred to as "Patent Literature 1").

A brushless motor 17 described in Patent Literature 1 includes a sensor circuit board (sensor board) 24 and a short circuit member 25. The sensor board 24 is equipped with a rotation detection element. The rotation detection element detects the position of a permanent magnet 63 disposed on a rotor 19, and outputs a rotation detection signal. The short circuit member 25 has a ring shape and includes six short circuit tabs 53. The short circuit tabs 53 connect six coils 23 in delta connection. The coils 23 are sequentially wound about a stator core 20 made of laminated steel plate.

The stator core 20 includes six teeth 26 that the coils 23 are wound thereabout, respectively. The stator core 20 is interposed between a front insulator 21 and a rear insulator 22. The front insulator 21 includes six fitting portions 29 that are integrally molded therewith and each of which is fitted between adjacent two of the teeth 26. Likewise, the rear insulator 22 includes six fitting portions 39 integrally molded therewith. The short circuit member 25 is attached to the front side of the front insulator 21, while the sensor board 24 is interposed therebetween. Six fusing terminals 42 are attached to the front insulator 21, and each is electrically connected to corresponding one of windings 23a disposed between the coils 23. Each of the fusing terminals 42 is soldered to corresponding one of the short circuit tabs 53 of the short circuit member 25. Two of the short circuit tabs 53 are disposed on each of three sheet metal members 52A to 52C. Power supply lines 57 are welded to the sheet metal members 52A to 52C on a one-by-one basis. The power supply lines 57 reach an attachment portion 4 for a battery pack 5.

BRIEF SUMMARY

In the hammer drill described in Patent Literature 1, the short circuit member 25 is attached to the front insulator 21, while the sensor board 24 is interposed therebetween. The fusing terminals 42 are then soldered to the short circuit tabs 53, respectively. Therefore, the sensor board 24 cannot be removed unless the fusing terminals 42 are unsoldered from the short circuit tabs 53, respectively. This makes it difficult to repair, replace or inspect the sensor board 24.

It is an object of the present invention to provide a power tool whereby reduction is made for time-consuming effort and cost required in trouble, inspection and so forth related to a motor.

The first aspect of a power tool includes:
a plurality of coils;
an insulator holding the plurality of coils;
a terminal unit electrically connected to the plurality of coils, the terminal unit attached to the insulator;
a rotor rotatable with respect to the insulator; and
a sensor board detecting rotation of the rotor, the sensor board attached to the terminal unit, the sensor board detachable from the terminal unit while the terminal unit is attached to the insulator.

The second aspect of a power tool includes:
a plurality of coils;
an insulator holding the plurality of coils;
a terminal unit electrically connected to the plurality of coils, the terminal unit attached to the insulator;
a rotor rotatable with respect to the insulator; and
a sensor board detecting rotation of the rotor, the sensor board attached to at least one of the insulator and the terminal unit integrally attached to the insulator.

According to the power tool of the present invention, it is possible to reduce time-consuming effort and cost required in trouble, inspection and so forth related to a motor.

DETAILED DESCRIPTION

An embodiment and modifications of the present invention will be hereinafter explained based on drawings on an as-needed basis.

In the embodiment and modifications, directional terms "front", "rear", "up", "down", "right" and "left" are defined for convenience of explanation, and are changed in accordance with a work condition, a state of a member in movement, and so forth.

It should be noted that the present invention is not limited to the following embodiment and modifications.

Figure 1:
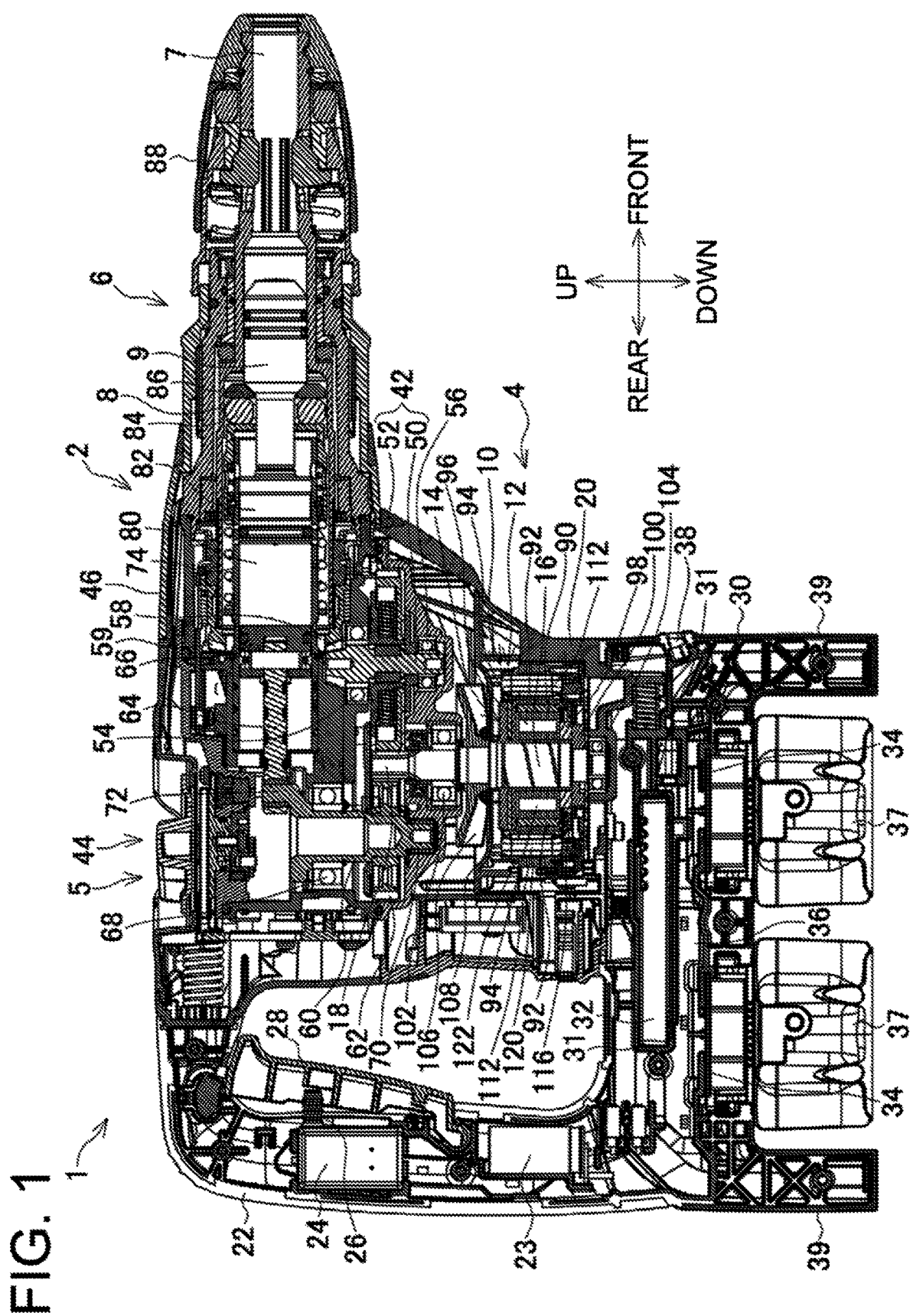
FIG. 1 is a vertical, central, cross-sectional view of a hammer drill according to an embodiment.
Figure 2:
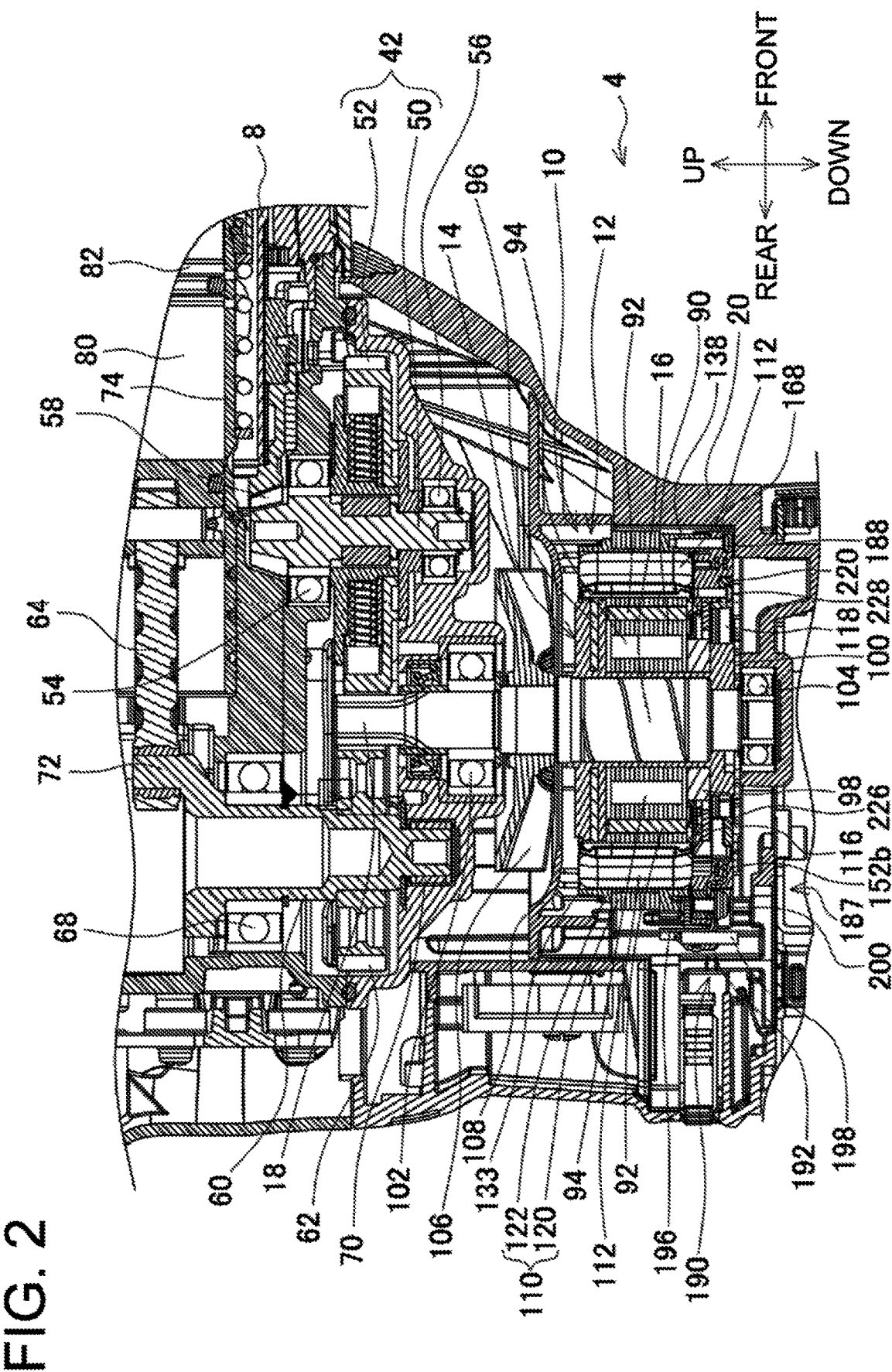
FIG. 2 is a partial enlarged view of FIG. 1.
Figure 3:
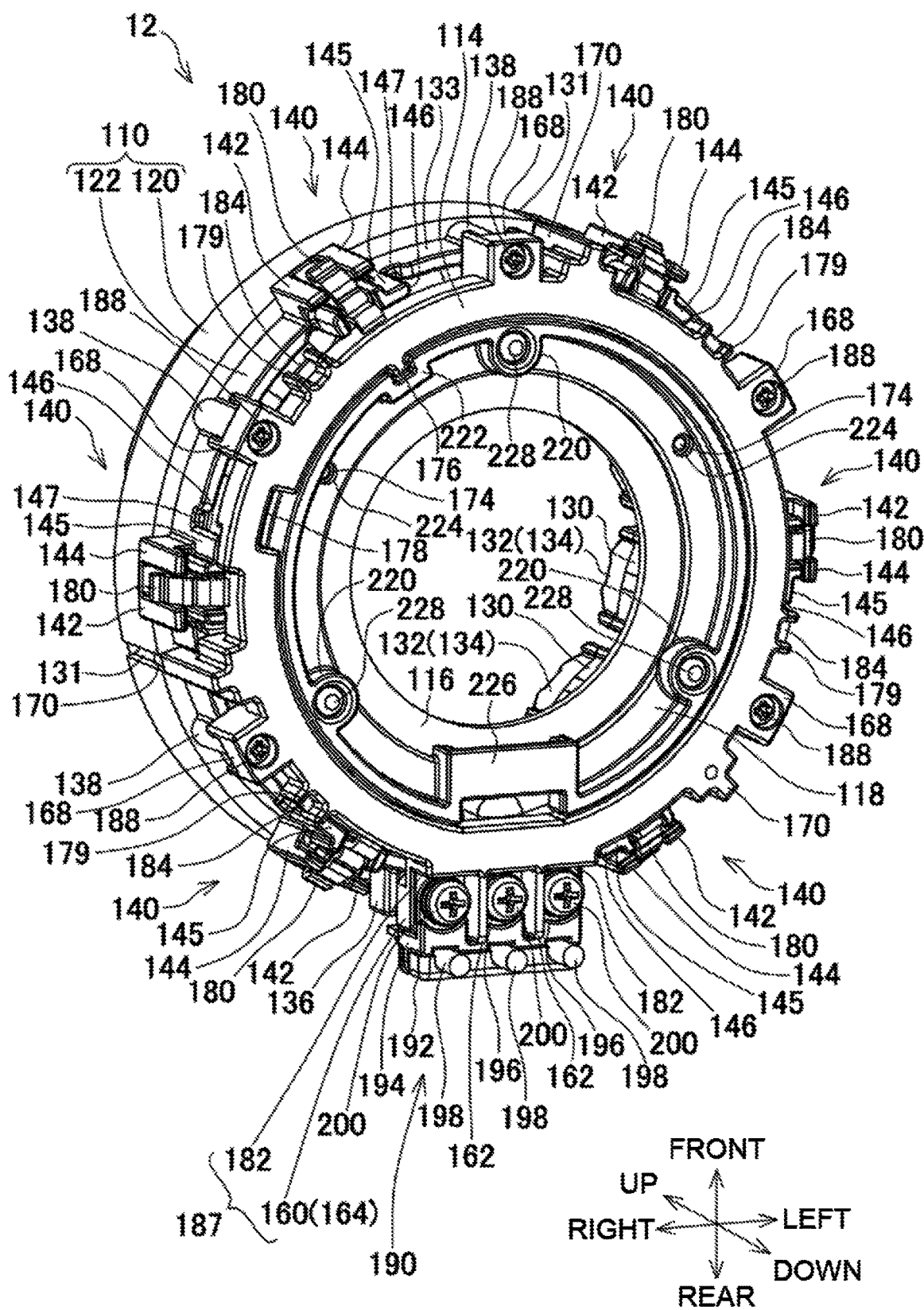
FIG. 3 is a perspective view of a stator of a motor in the embodiment.
Figure 4:
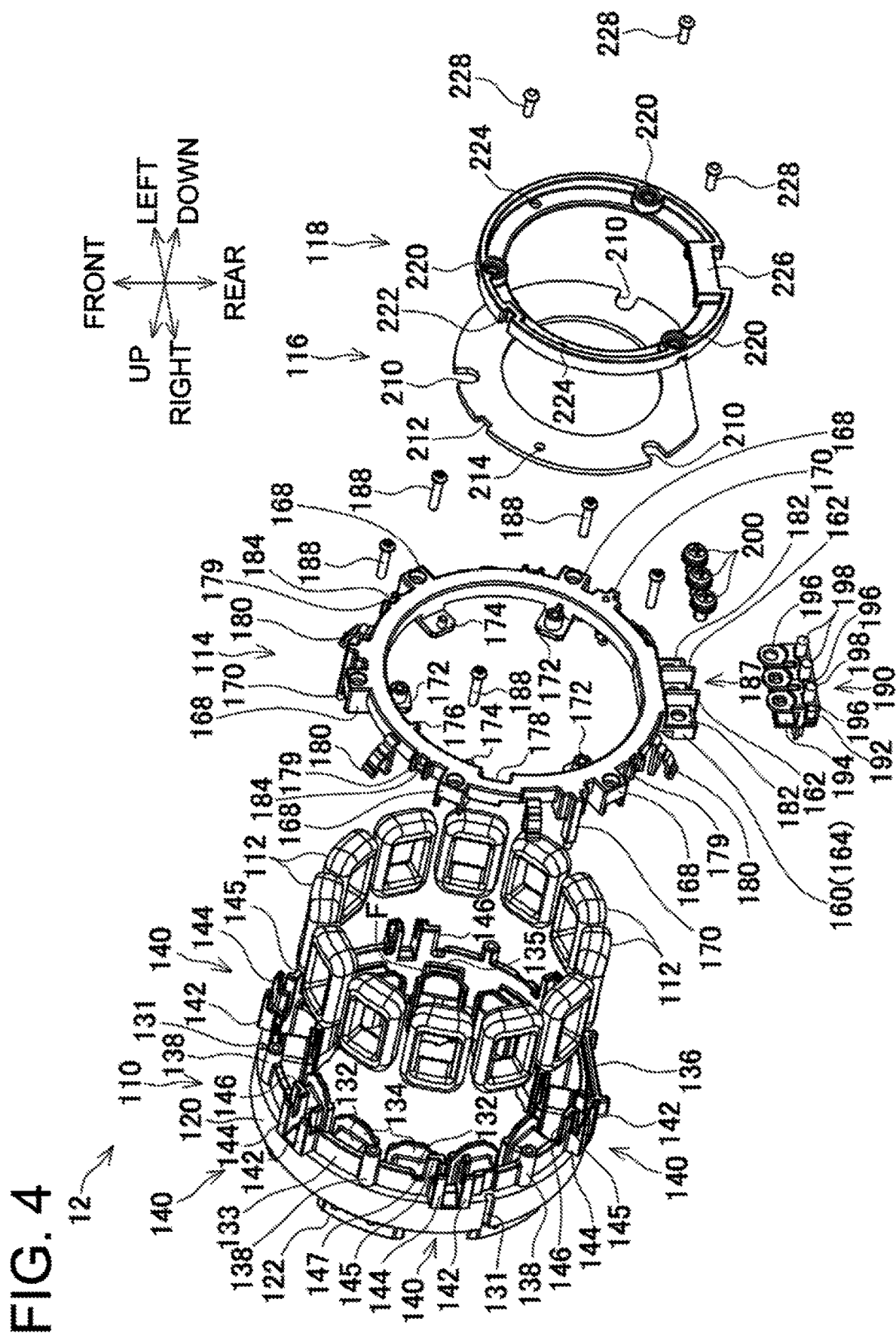
FIG. 4 is an exploded perspective view of FIG. 3.
Figure 5:
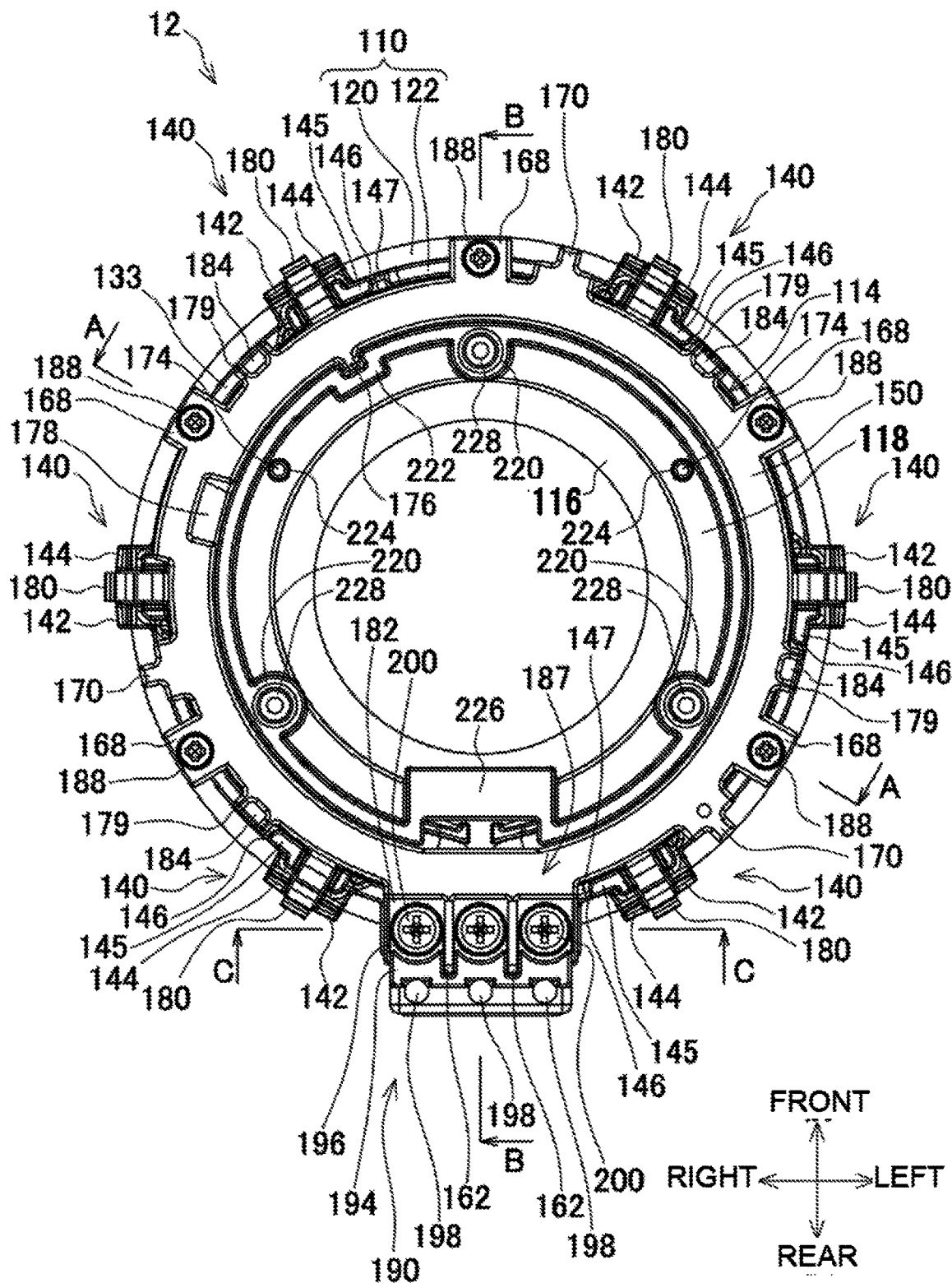
FIG. 5 is a bottom view of FIG. 3.
Figure 6:
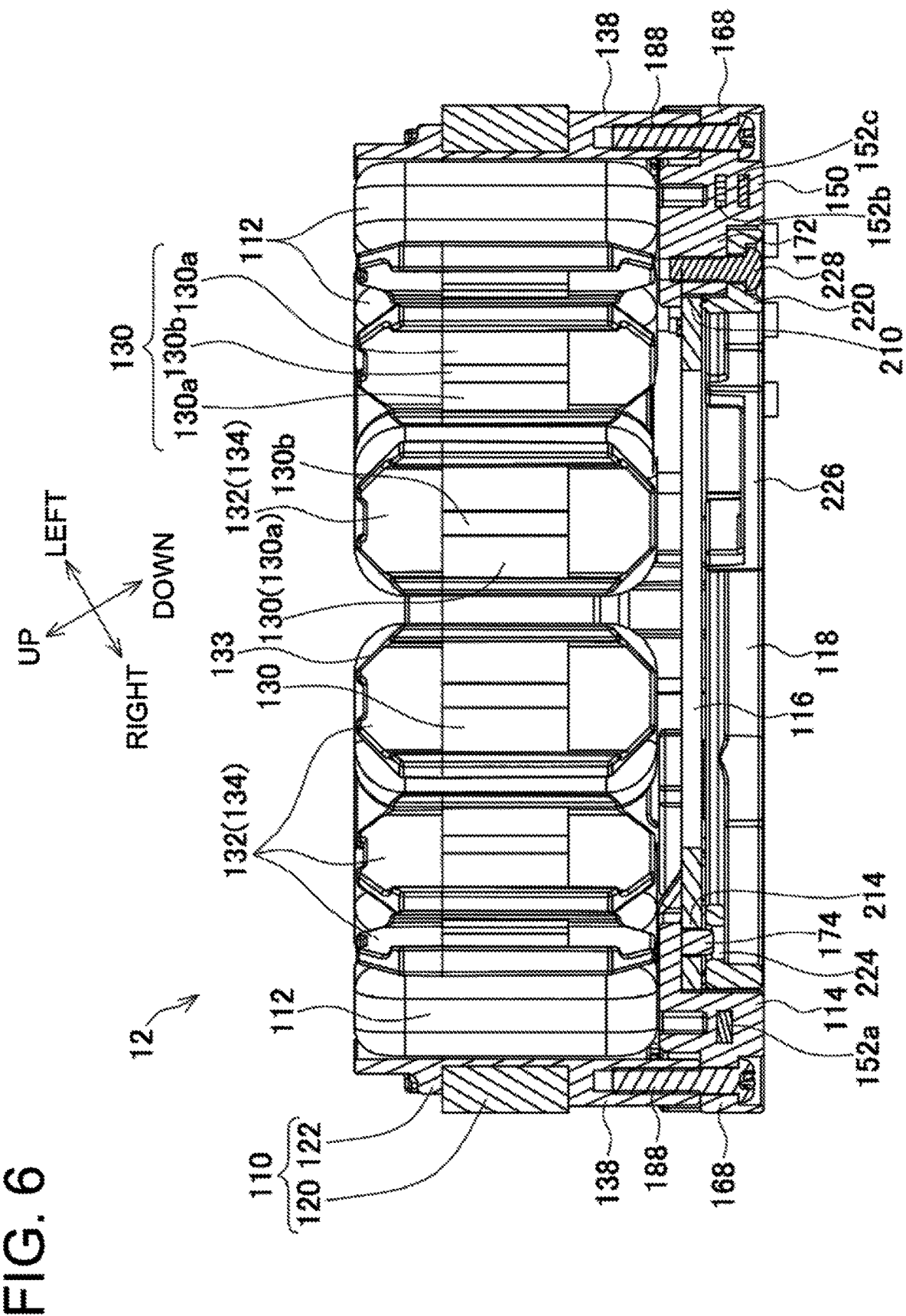
FIG. 6 is a cross-sectional view of FIG. 5 taken along line A-A.
Figure 7:
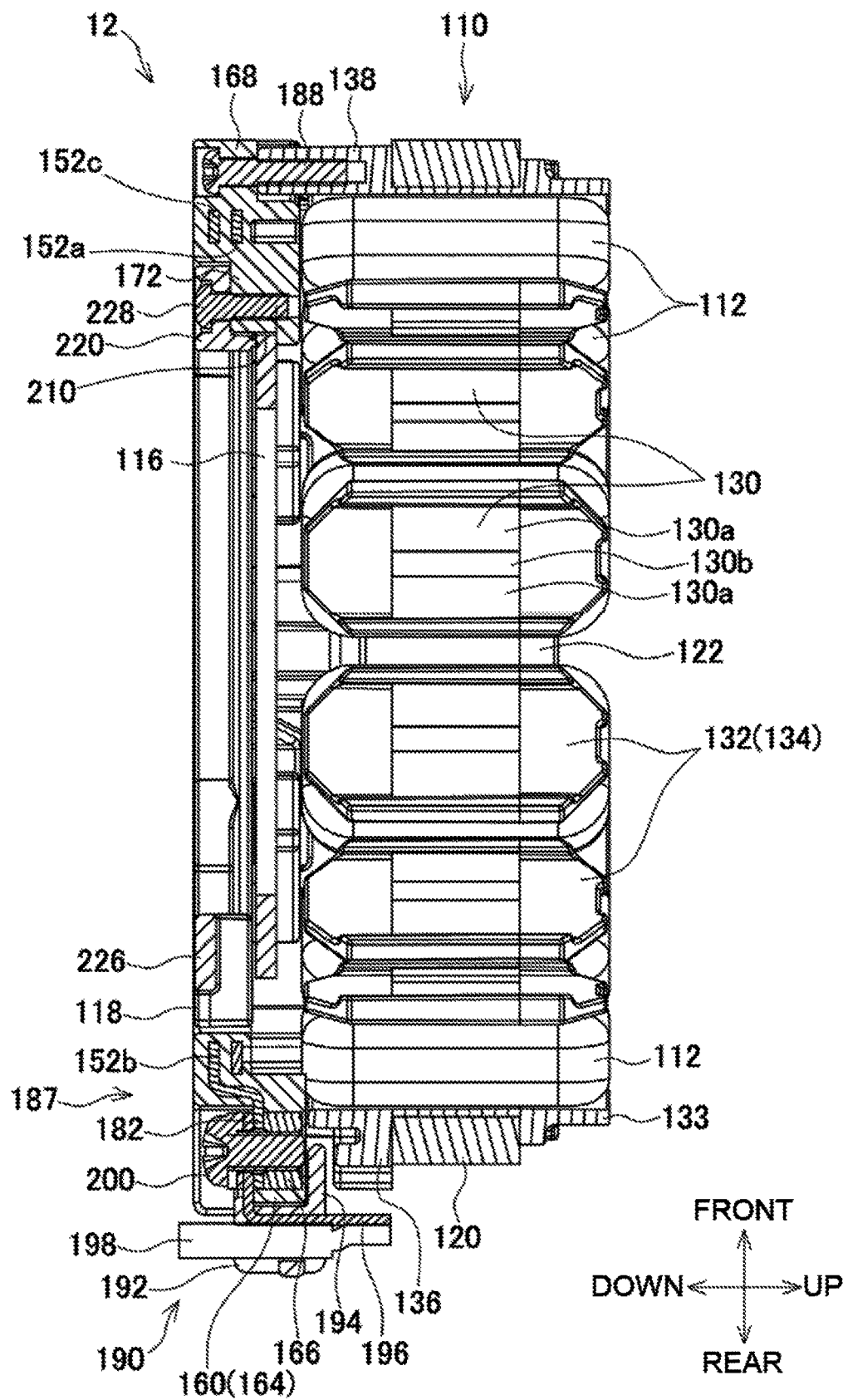
FIG. 7 is a cross-sectional view of FIG. 5 taken along line B-B.
Figure 8:
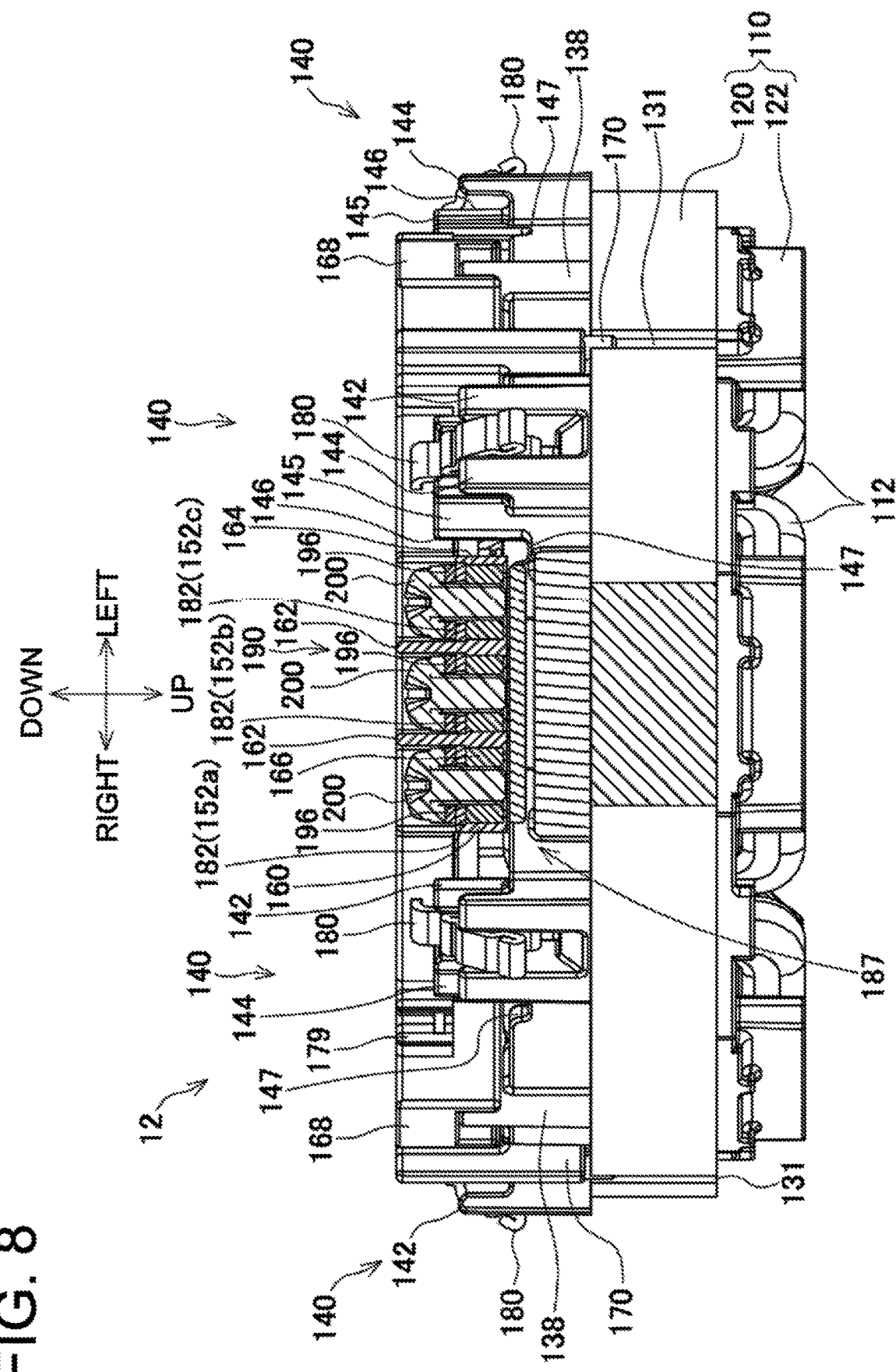
FIG. 8 is a cross-sectional view of FIG. 5 taken along line C-C.

FIG. 1 is a vertical, central, cross-sectional view of a hammer drill 1 as an example of a power tool (impact tool) according to the embodiment, whereas FIG. 2 is an enlarged view of a front part in FIG. 1.

The hammer drill 1 includes a housing 2, a power part 4, an intermediate part 5 and an output part 6. The housing 2 is a frame for holding a variety of members. The power part 4 is disposed in the middle of the housing 2, and generates a power. The intermediate part 5 is disposed above the power part 4, and converts and transmits the power of the power part 4. The output part 6 is disposed forward of the intermediate part 5, and outputs the power that is generated by the power part 4 and is then converted by the intermediate part 5 on an as-needed basis.

The output part 6 includes a tool holder 8 and an impact bolt 9. The tool holder 8 is provided with a tool socket holding portion 7 on the front side thereof. The tool socket holding portion 7 has a tubular shape and enables a tool socket to be attached to the front end thereof. The impact bolt 9 is disposed inside the tool holder 8, and applies an impact to the tool socket.

The power part 4 includes a motor 10.

The motor 10 is an inner rotor type brushless motor and includes a stator 12 and a rotor 14. The stator 12 has a tubular shape and the axis thereof extends in the up-and-down direction. The rotor 14 is disposed in the interior of the stator 12, and is rotatable with respect to the stator 12. The rotor 14 includes a motor shaft 16, disposed in the up-and-down direction, as the axis thereof. The motor shaft 16 includes a pinion 18 formed on the upper end thereof.

The housing 2 includes a motor housing 20 for holding the motor 10.

A handle housing 22, formed by combining right and left members split in halves, is connected to the rear portion of the motor housing 20. The handle housing 22 is made in the shape of a loop. A portion of the loop, located on the rear side with respect to the up-and-down direction, is mainly grasped by a worker. A condenser 23 and a switch 24 are held by the rear portion of the handle housing 22. The switch 24 includes a plunger 26. The plunger 26 protrudes forward and can be pushed rearward. The switch 24 is switched in accordance with whether or not the plunger 26 is pushed and the pushed amount of the plunger 26. The plunger 26 is coupled to a trigger 28 protruding forward from the rear portion of the handle housing 22.

A lower housing 30 is disposed on the lower side of the motor housing 20 and the handle housing 22. The housing 2 includes the lower housing 30.

Two ribs 31, each having a U-shape, are raised inside the lower housing 30 and hold a controller 32. The controller 32 is embedded with a microcomputer (not shown in the drawings) for controlling the motor 10 and so forth and a switching element (not shown in the drawings).

A battery attachment portion 36 is disposed below the controller 32, and specifically, on the lower surface of the lower housing 30. The battery attachment portion 36 includes two terminal blocks 34 disposed back and forth. Battery packs 37 are slid in the right-and-left direction from the right side, and are attached to the terminal blocks 34, respectively.

A light 38 such as an LED is disposed forward of the controller 32 in the front portion of the lower housing 30 in order to irradiate ahead of the output part 6.

Guard plate portions 39 are formed on the front and rear portions of the lower housing 30. The guard plate portions 39 protrude downward therefrom, while covering the attached battery packs 37 from front and rear.

The controller 32 is electrically connected to the motor 10, the condenser 23, the respective terminal blocks 34 and the light 38 through lead wires (not shown in the drawings).

The intermediate part 5 includes a power transmission mechanism 42, an impact mechanism 44 and an output housing 46. The output housing 46 is formed by combining right and left members split in halves as the outer shell of the power transmission mechanism 42 and the impact mechanism 44. The housing 2 includes the output housing 46.

The power transmission mechanism 42 transmits a rotational driving force of the motor shaft 16 to the tool holder 8. The power transmission mechanism 42 includes an intermediate shaft 50 extending in the up-and-down direction and a gear 52 integrally attached to the middle portion of the intermediate shaft 50.

The intermediate shaft 50 is supported by an upper bearing 54 and a lower bearing 56, while being rotatable about the center axis thereof.

The gear 52 is meshed with the front portion of the pinion 18.

Bevel teeth 58 are formed on the upper end of the intermediate shaft 50.

The bevel teeth 58 are meshed with a bevel gear 59 connected to the rear end of the tool holder 8.

The impact mechanism 44 converts a rotational output of the motor shaft 16 into a back-and-forth directional reciprocating output and transmits the back-and-forth directional reciprocating output to the impact bolt 9, whereby an impact is applied to the impact bolt 9.

The impact mechanism 44 includes a crankshaft 60 extending in the up-and-down direction, a gear 62, a connecting rod 64 and a piston 66. The gear 62 is integrally attached to the lower portion of the crankshaft 60, and is meshed with the rear portion of the pinion 18. With the aforementioned configuration, the rotational output of the motor shaft 16 is converted into the back-and-forth directional reciprocating output.

The crankshaft 60 is supported by an upper bearing 68 and a lower bearing 70, while being rotatable about the center axis thereof. The crankshaft 60 is provided with a crank pin 72 on the upper end thereof. The crank pin 72 protrudes upward therefrom, while being eccentric from the center axis of the crankshaft 60. The piston 66 is coupled to the crank pin 72 through the connecting rod 64. The piston 66 has a columnar shape and makes contact, at part or entirety of the outer surface thereof, with the inner surface of a cylinder 74. The cylinder 74 has a cylindrical shape and includes an axis extending in the back-and-forth direction. The piston 66 is moved inside the cylinder 74 in the back-and-forth direction. The front portion of the cylinder 74 is disposed inside the tool holder 8.

A striker 82 is disposed forward of the piston 66 through an air chamber 80 inside the cylinder 74. With this configuration, the back-and-forth directional reciprocating output is transmitted to the impact bolt 9.

The striker 82 has a columnar shape and makes contact, at part or entirety of the outer surface thereof, with the inner surface of the cylinder 74. The striker 82 is reciprocated inside the cylinder 74 in the back-and-forth direction.

The air chamber 80 is a space enclosed by the rear surface of the striker 82, the front surface of the piston 66, and part of the inner surface of the cylinder 74. The air chamber 80 transmits the reciprocating motion of the piston 66 to the striker 82 by fluctuation in pressure of air.

The front end of the cylinder 74 includes a front wall that has a hole in the middle thereof and extends up, down, right and left.

A receiver ring 86 is disposed forward of the cylinder 74 through a ring 84 made of elastic material in the interior of the tool holder 8.

The impact bolt 9 is disposed forward of the striker 82. The impact bolt 9 includes a rear portion having a columnar shape and a front portion having a columnar shape and a larger diameter than the rear portion. The rear end of the tool socket inserted into the tool socket holding portion 7 presses the front end of the impact bolt 9, whereby the impact bolt 9 is retracted to make contact at a boundary portion between the front and rear portions with the receiver ring 86. Accordingly, the rear half of the rear portion of the impact bolt 9 is located inside the tool holder 8 and the cylinder 74, while passing through the hole of the front wall of the cylinder 74. Also, the front half of the rear portion of the impact bolt 9 is located inside the tool holder 8 and the ring 84. On the other hand, the front portion of the impact bolt 9 is located inside the tool holder 8.

The striker 82 strikes the tool socket attached to the tool socket holding portion 7 by reciprocating back and forth to repeatedly collide with the rear end of the tool socket through the impact bolt 9.

An operating sleeve 88, having a cylindrical shape, is disposed forward of the output housing 46 and outside the tool holder 8 in order to perform an attachment/detachment operation for the tool socket.

The rotor 14 of the motor 10 includes a rotor core 90 having a cylindrical shape and permanent magnets 92 each having a plate shape. The rotor core 90 is integrally attached to the middle portion of the motor shaft 16 so as to be concentric to the motor shaft 16. The permanent magnets 92 are disposed in a plurality of (eight) through holes, respectively. The through holes, each extending in the up-and-down direction, are aligned in the circumferential edge portion of the rotor core 90 so as to be concentric to the motor shaft 16.

The rotor core 90 is a laminate formed by laminating a plurality of electromagnetic steel plates. The rotor core 90 includes a plurality of (four) recesses (hollow portions) 94 between the permanent magnets 92 and the motor shaft 16. Each recess 94 extends in a quarter cylindrical shape having the up-and-down direction as the axial direction thereof.

The permanent magnets 92 are disposed in the shape of a regular octagonal prism as a whole, and are slightly separated from each other in the circumferential direction. Protruding spaces (not shown in the drawings) are formed on the both ends of each through hole. Each protruding space is formed over one end of each permanent magnet 92 so as to protrude circumferentially outward therefrom to an intermediate position between each permanent magnet 92 and its circumferentially adjacent permanent magnet 92. The protruding spaces continue to the main space of each through hole penetrated by each permanent magnet 92, and are part of each through hole.

An upper sleeve 96 is disposed on the upper side of the rotor core 90. The upper sleeve 96 is made in the shape of a disc having the same radius as the rotor core 90. A lower sleeve 98 is disposed on the lower side of the rotor core 90 such that the outer periphery thereof is located radially inside the permanent magnets 92.

A resin 100 is disposed so as to extend to regions over and under the upper sleeve 96, a region under the lower sleeve 98, and a region connecting these regions, i.e., a region on the outer peripheral side of the motor shaft 16. The rotor 14 is integrated by the resin 100. The resin 100 is disposed between the upper sleeve 96 and the motor shaft 16, between the rotor core 90 and the motor shaft 16, and between the lower sleeve 98 and the motor shaft 16.

The motor shaft 16 is supported by an upper bearing 102 and a lower bearing 104, while being rotatable about the center axis thereof.

The upper bearing 102 is disposed on the lower side of the pinion 18, and is held by the output housing 46.

The lower bearing 104 is held by the motor housing 20, while being disposed about the lower end of the motor shaft 16 and on the lower side of the lower sleeve 98.

A centrifugal fan 106, having a disc shape, is integrally attached to the upper portion of the motor shaft 16 so as to be orthogonal to the motor shaft 16, while being disposed between the upper bearing 102 and the upper sleeve 96.

A baffle plate 108, having a saucer shape, is disposed between the centrifugal fan 106 and the upper sleeve 96 so as to cover the lower side of the centrifugal fan 106. The baffle plate 108 is held by the motor housing 20.

As shown in FIGS. 3 to 8, the stator 12 of the motor 10 includes a stator core assembly 110, a plurality of (twelve) coils 112, a terminal unit 114, a sensor board 116 and a board presser member 118.

The stator core assembly 110 includes a stator core 120 and an insulator 122. The insulator 122 is held by the stator core 120, while being disposed above, below and inside the stator core 120.

The stator core 120 is a laminate obtained by laminating a plurality of electromagnetic steel plates each having a ring shape. The stator core 120 includes a plurality of (twelve) teeth 130 on the inner peripheral portion thereof. The teeth 130 protrude radially inward therefrom and are aligned at equal intervals in the circumferential direction.

The radially inner tip surface of each tooth 130 has an inwardly bulging shape. In more detail, each tooth 130 includes both side bulging portions 130a and a middle recessed portion 130b. The both side bulging portions 130a gradually bulge inward from the both circumferential ends of the tip surface to positions close to the middle portion of the tip surface. The middle recessed portion 130b is shallowly recessed radially outward on the middle portion of the tooth tip so as not to radially reach an imaginary arc connecting the both ends of the tooth tip. With the tip surface shape of each tooth 130 described above, transition in magnetic pole is smoothly regulated in a magnetic field excited by the coils 112 in conjunction with switching of the switching element, and rotation of the rotor 14 is stabilized as much as possible.

Spaces, produced between adjacent teeth 130, function as slots in which the coils 112 are disposed.

A plurality of (three) outer grooves 131, each extending in the up-and-direction, are formed on the cylindrical surface of the outer peripheral portion of the stator core 120. The outer grooves 131 are disposed at equal intervals in the circumferential direction.

The insulator 122 is a ring-shaped electrically insulating member made of resin, and includes tooth coating portions 132 and a cylindrical portion 133. The tooth coating portions 132 are disposed outside the teeth 130, respectively. The cylindrical portion 133 bulges downward in a ring shape, while connecting the tooth coating portions 132.

Figure 9A:
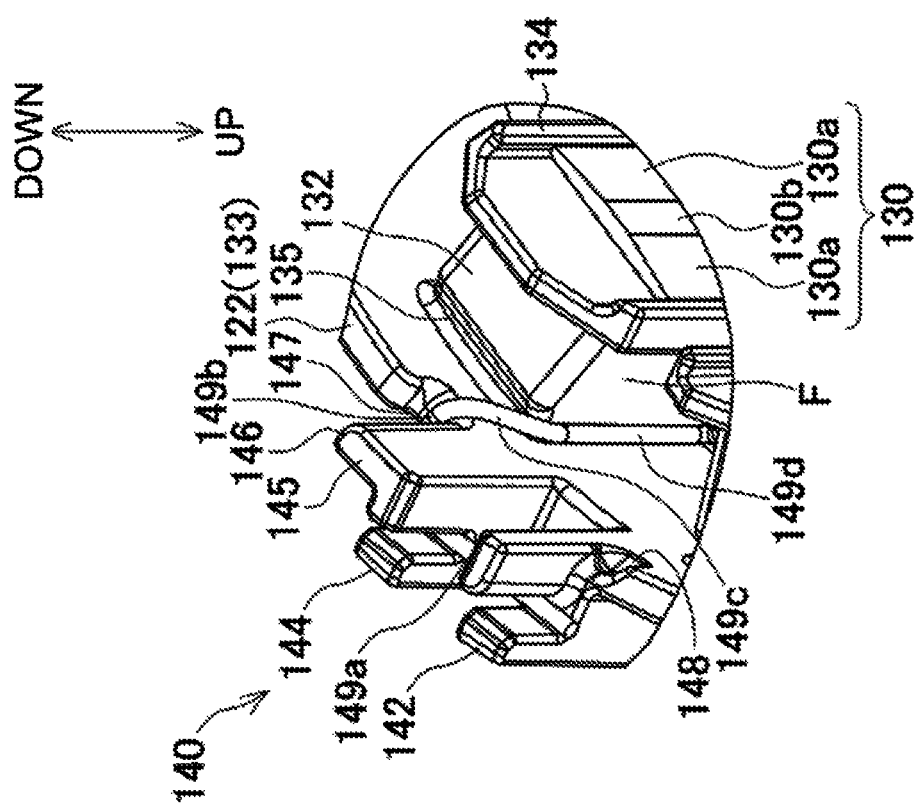
FIG. 9A is a diagram showing a rear view of the vicinity of teeth and a fusing terminal slot and FIG. 9B is a diagram showing a perspective view of the vicinity of the teeth and the fusing terminal slot.
Figure 9B:
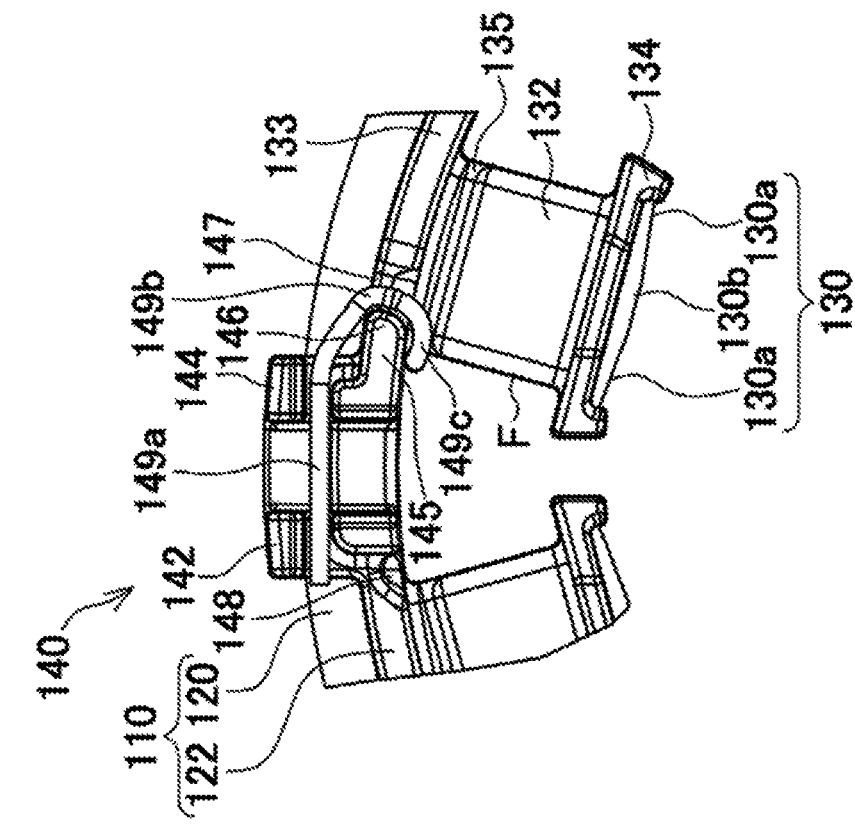

As shown also in FIG. 9, each tooth coating portion 132 coats corresponding one of the teeth 130 except for the tip thereof. Each tooth coating portion 132 includes a wall portion 134 adjacent to the tip of the corresponding tooth 130. The wall portion 134 extends to the upper side, the lower side and the both circumferential sides from the tip of the corresponding tooth 130. On the other hand, each tooth coating portion 132 includes grooves 135 circumferentially formed on the upper and lower sides of a region thereof coating the root of the corresponding tooth 130. Each groove 135 has a width corresponding to the thickness of one of the windings of each coil 112.

A connection part guard 136 is formed outside the cylindrical portion 133, while protruding radially outward from the rear portion of the insulator 122. The middle portion of the connection part guard 136 is disposed between two teeth 130 disposed on the rear side. The right and left ends of the connection part guard 136 are disposed inside the right and left ends of the two teeth 130 disposed on the rear side.

A plurality of (five) screw boss portions 138, each having a screw hole extending in the up-and-down direction, are formed on the lower portion of the cylindrical portion 133. The five screw boss portions 138 and the connection part guard 136 are disposed at equal intervals in the circumferential direction, and fusing terminal slots 140 are disposed between adjacent pairs of the screw boss portions 138 and the connection part guard 136, respectively. Thus, the fusing terminal slots 140 are disposed away from each other at equal intervals in the circumferential direction. Each tooth 130 is located between and inside each fusing terminal slot 140 and either the connection part guard 136 or each screw boss portion 138.

As shown in FIG. 9, each fusing terminal slot 140 includes a pair of first and second protrusions 142 and 144 each having a U-shaped cross section. The first and second protrusions 142 and 144 are aligned in the circumferential direction.

As seen from below, the second protrusion 144 is disposed downstream of the first protrusion 142 in the clockwise direction.

Each of the first and second protrusions 142 and 144 protrudes radially outward of the cylindrical portion 133, and furthermore, protrude downward at two positions located radially inside and outside. The inside protruding portion protrudes downward with a larger height than the outside protruding portion, and a region between the inside and outside protruding portion continues to the lower surface of the cylindrical portion 133. Additionally, a region between the first protrusion 142 and the second protrusion 144 more upwardly dents than the lower surface of the cylindrical portion 133. Furthermore, the inside protruding portion of the second protrusion 144 includes an extension portion 145 extending in the circumferential direction. The extension portion 145 includes a protrusion end 146, located on the clockwise side as seen from below, as an end side thereof extending in the up-and-down direction. The protrusion end 146 continues to each fusing terminal slot 140 as part of each fusing terminal slot 140.

The inside protruding portion of the second protrusion 144, including the extension portion 145 and the protrusion end 146, downwardly protrudes with the largest height among the portions downwardly protruding from the cylindrical portion 133. The tip of the inside protruding portion is the lowermost portion of the insulator 122.

A recess 147 is formed outside each protrusion end 146. The recess 147 has a size approximately equal to the cross-sectional diameter of one of the windings of each coil 112. The root portion (upper portion) of each protrusion end 146 is common to the counterclockwise end side of the recess 147. The up-and-down directional position of the bottom portion (upper side portion) of the recess 147 and that of the region between the first protrusion 142 and the second protrusion 144 are approximately the same.

The protrusion end 146 is disposed on the clockwise side of a surface F of the tooth coating portion 132 corresponding (closest) thereto in the circumferential direction. The surface F is the counterclockwise surface of the tooth coating portion 132 as seen from below.

A dent 148, denting upward, is formed on the root of the inside protruding portion of the first protrusion 142. With the dent 148, the root of the inside protruding portion of the first protrusion 142 can be prevented from bulging in molding. It should be noted that likewise, with the layout of the recess 147, the root of the protrusion end 146 can be prevented from bulging in molding.

The stator core assembly 110 is formed by integral molding of the stator core 120 and the insulator 122.

A method herein employed for integral molding is not particularly limited to a specific one. For example, insert injection molding may be employed in which the stator core 120 is inserted into a mold and then resin is injected into the mold so as to integrally mold the insulator 122 with the stator core 120.

The insulator 122 is seamlessly disposed in continuous form from the upper side of the stator core 120 to the lower side of the stator core 120 (the bulging lower portions of the cylindrical portion 133 including the connection part guard 136, the screw boss portions 138 and the fusing terminal slots 140) through the inner side of the stator core 120 except for the tip surfaces of the teeth 130 (the tooth coating portions 132 and the cylindrical portion 133).

Each coil 112 is formed by winding a wire about each tooth coating portion 132.

Figure 10:
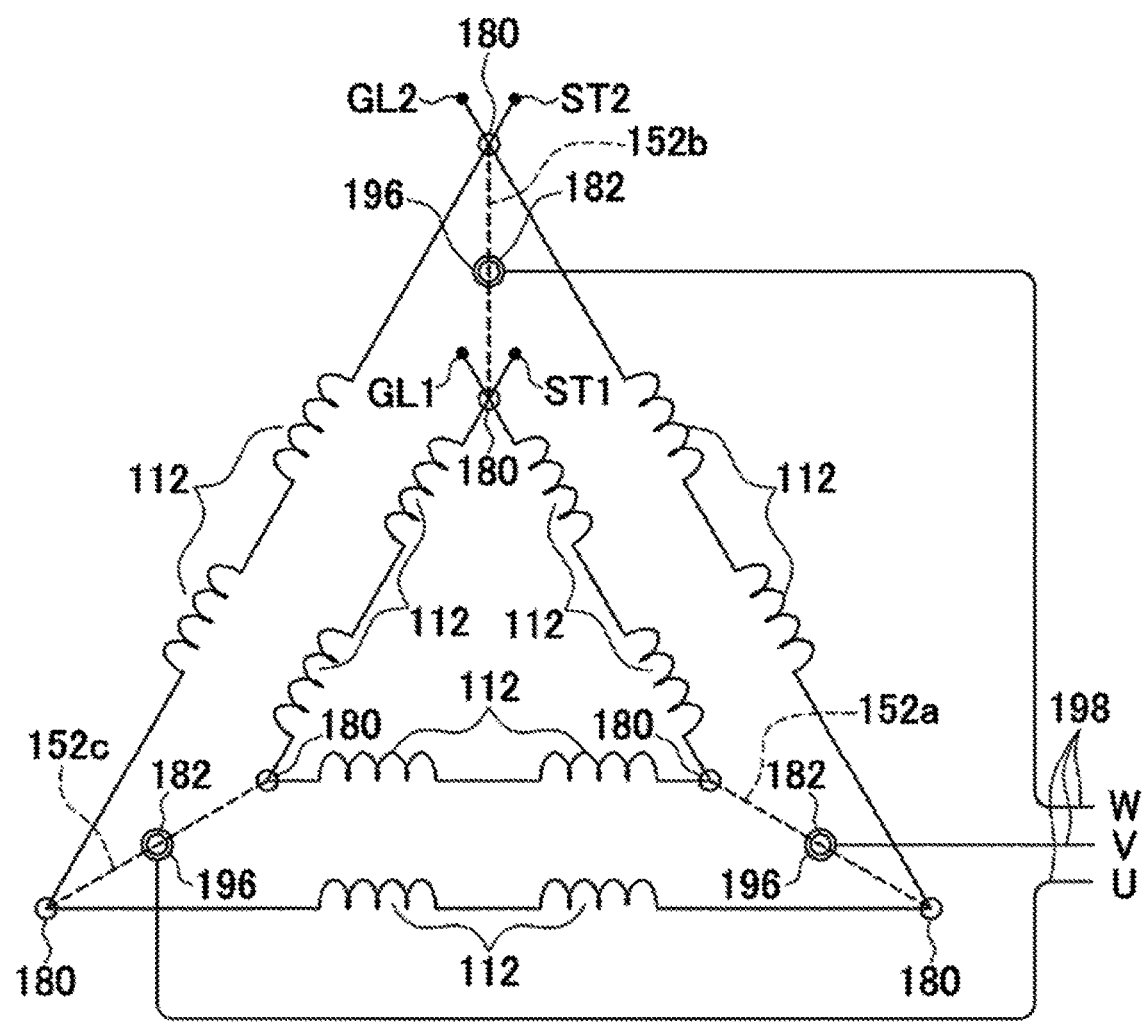
FIG. 10 is a circuit diagram of coils in a stator in the embodiment.

As shown in FIG. 10, the twelve coils 112 are grouped into totally three units each including four coils 112, and are connected in (three phase) delta connection. In each unit, two pairs of coils 112, each pair of which is connected in series, are connected in parallel (in a 2s2p (two-series two-parallel) configuration).

The twelve coils 112 are formed by two conductive wires.

A first conductive wire is stretched from a winding start ST1 across the first and second protrusions 142 and 144 in an initial fusing terminal slot 140, and is then wound about two tooth coating portions 132. Subsequently, the first conductive wire is stretched to the next fusing terminal slot 140, and is then wound about two tooth coating portions 132. Furthermore, the first conductive wire is stretched to the yet next fusing terminal slot 140, and is stretched to the initial fusing terminal slot 140, and reaches a winding goal GL1.

On the other hand, winding of a second conductive wire is made from a winding start ST2 to a winding goal GL2 in a similar manner to the first conductive wire. It should be noted that the second conductive wire passes through the fusing terminal slots 140 and the tooth coating portions 132, both of which the first conductive wire does not pass therethrough.

As shown especially in FIG. 9, a conductive wire portion continues from a bridge line portion 149a stretched across the fusing terminal slot 140 from the first protrusion 142 to the second protrusion 144, and enters the recess 147. Then, the conductive wire portion is hooked on the protrusion end 146, and is bent as a turn portion 149b in a U-turn shape. Furthermore, the conductive wire portion is introduced, as an oblique introduction portion 149c, to the surface F (the counterclockwise surface as seen from below) of the corresponding tooth coating portion 132 in a manner oblique to the up-and-down direction. The oblique introduction portion 149c continues to a down-to-up portion 149d of the first one of the windings about the corresponding tooth coating portion 132, while the upper end thereof is hooked on the end of the lower-side one of the grooves 135 on the corresponding tooth coating portion 132. In the first winding about the corresponding tooth coating portion 132, the upper-side portion and the lower-side portion, both of which are stretched in the circumferential direction, are guided by the grooves 135, respectively. Each of the second and subsequent windings of the conductive wire is wound in the same manner as the first winding or the preceding winding thereof. The conductive wire, wound predetermined turns as described above, is disposed between the cylindrical portion 133 and the wall portion 134, and is obtained as the coil 112.

The protrusion end 146 protrudes downward with a large height. Therefore, in forming the turn portion 149b, it is easy to hook the conductive wire on the protrusion end 146 but it is difficult to unhook the conductive wire therefrom, whereby the turn portion 149b is prevented from separating from the protrusion end 146 and loosening. Additionally, the recess 147 is provided, whereby the protrusion end 146 is further increased in height by that much. Moreover, the conductive wire enters the recess 147. Therefore, in forming the turn portion 149b, it is easy to hook the conductive wire on the protrusion end 146 but it is difficult to unhook the conductive wire therefrom, whereby the turn portion 149b is prevented from loosening.

It should be noted that FIG. 9 omits illustration of a preceding conductive wire portion continuing to the bridge line portion 149a and a succeeding conductive wire portion continuing from the bridge line portion 149a, whereas the drawings except for FIG. 9 omit illustration of the conductive wire portions from the bridge line portion 149a to the oblique introduction portion 149c (except for conductive wire portions about the coil 112). The conductive wire portions from the bridge line portion 149a to the oblique introduction portion 149c function as a coil connecting conductive wire electrically connecting two coils 112 to each other.

Figure 11:
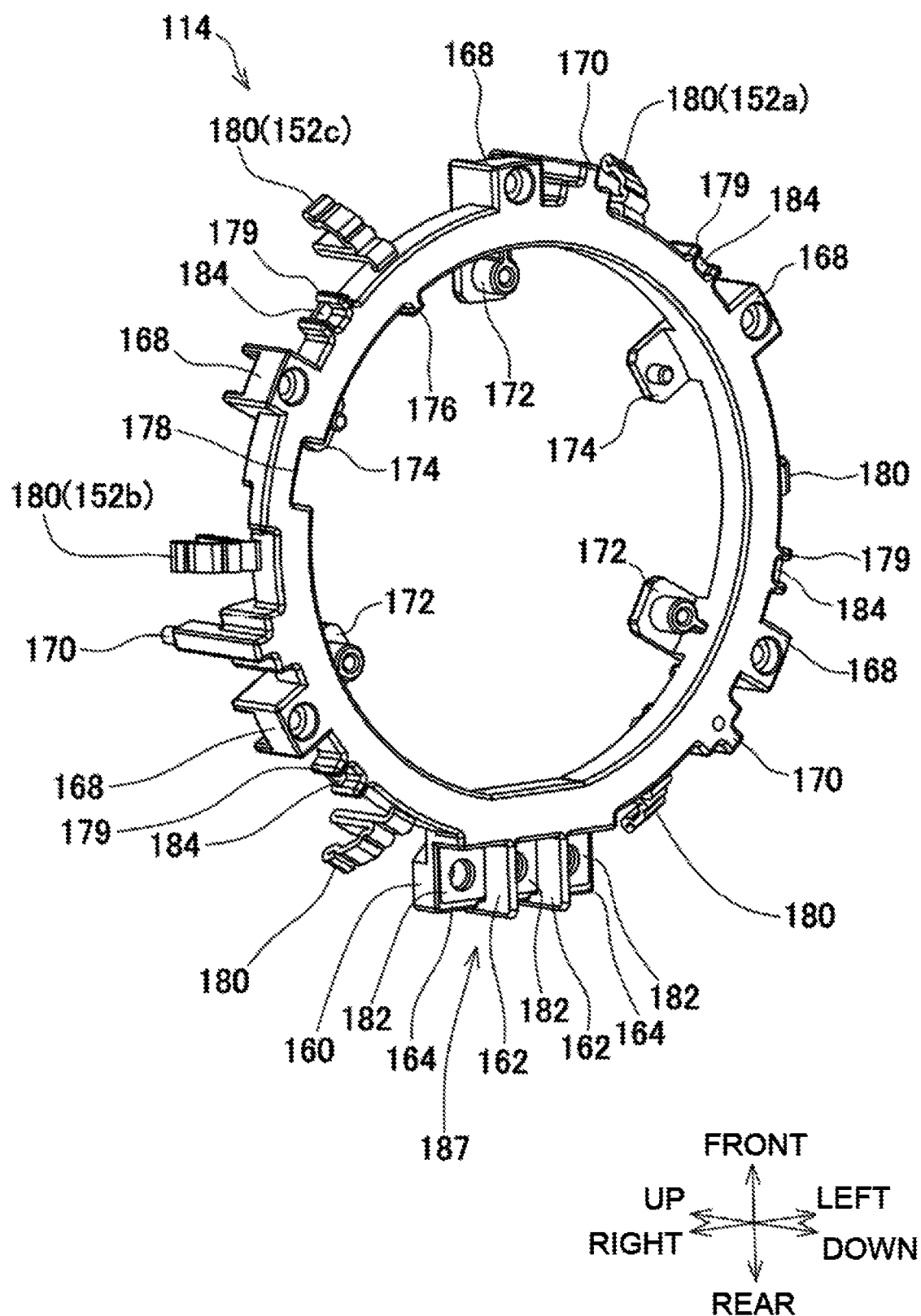
FIG. 11 is a perspective view of a terminal unit in the stator in the embodiment.
Figure 12:
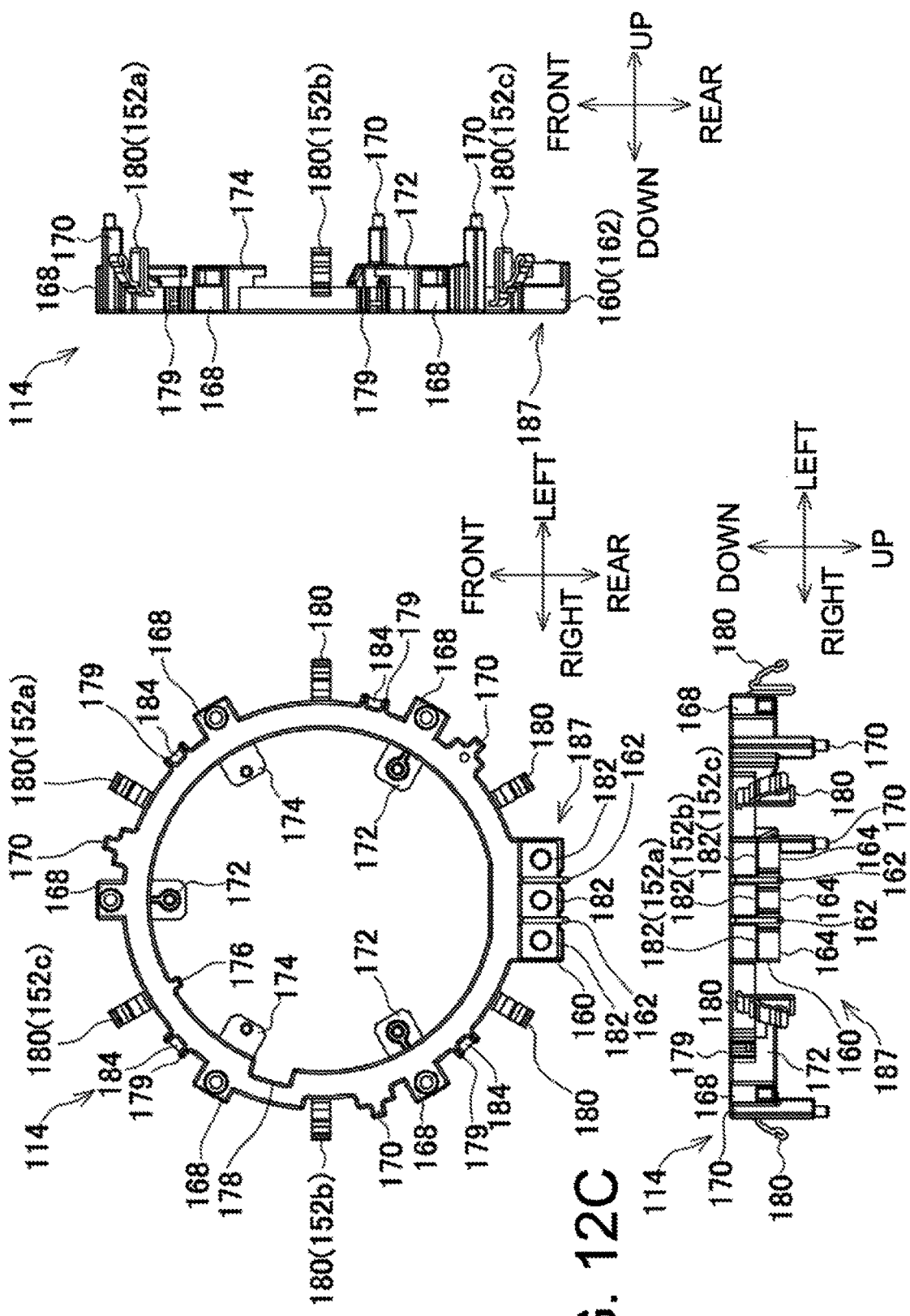
FIG. 12A is a diagram showing a bottom view of FIG. 11.
FIG. 12B is a diagram showing a right view of FIG. 11
FIG. 12C is a diagram showing a rear view of FIG. 11.
Figure 13:
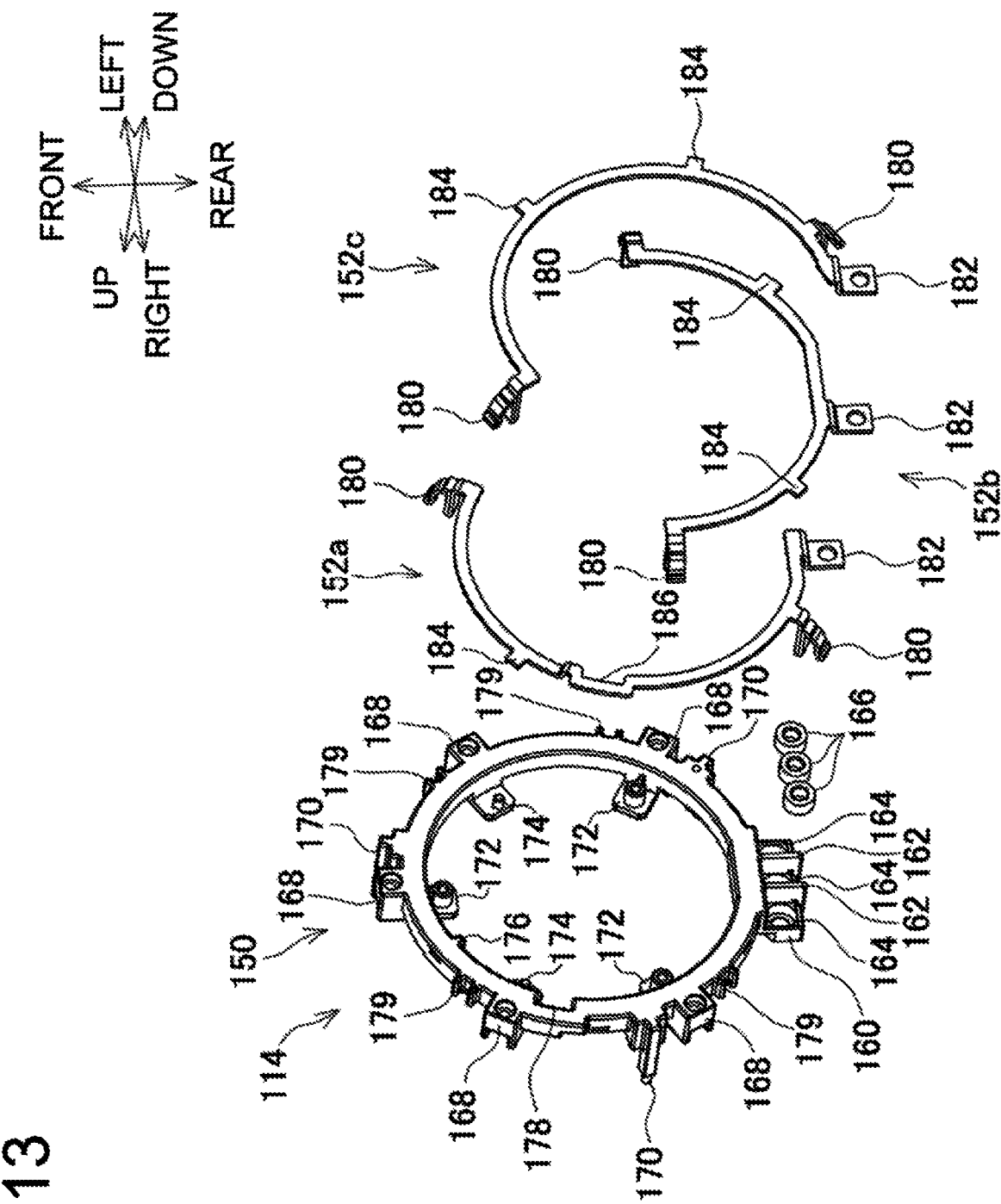
FIG. 13 is an exploded perspective view of FIG. 11.

The terminal unit 114 shown in FIGS. 11 to 13 includes a terminal unit body 150, a first sheet metal member 152a, a second sheet metal member 152b and a third sheet metal member 152c. The terminal unit body 150 is made of insulating resin, and is made in the shape of a ring having an inner hole. The first to third sheet metal members 152a, 152b and 152c are made of conductive metal.

The terminal unit body 150 includes a connection part base 160 protruding radially outward from the rear portion thereof. The connection part base 160 includes three cup portions 164. The cup portions 164 are aligned right and left, while interposing therebetween two partitions 162 each extending up and down. Screw bosses 166, each having a cylindrical shape, are inserted into the cup portions 164, respectively.

A plurality of (five) screw hole portions 168, each having a screw hole extending in the up-and-down direction, are formed on the circumferential edge of the terminal unit body 150. The screw hole portions 168 protrude radially outward therefrom, and are disposed in a similar manner to the screw boss portions 138.

Pin portions 170 are formed in adjacent positions to the front, rear right, and rear left screw hole portions 168. The pin portions 170 protrude radially outward therefrom and extend upward. As seen from below, the pin portions 170 are located on the vertexes of an imaginary regular triangle, respectively, while being disposed in correspondence with the outer grooves 131 of the stator core 120, respectively.

Screw boss portions 172, each having a screw hole opened downward, are formed on the terminal unit body 150. The screw boss portions 172 are disposed radially inside the front, rear right and rear left screw hole portions 168. The screw boss portions 172 protrude radially inward with respect to the terminal unit body 150.

Projection portions 174, each having a projection projecting downward, are formed on the terminal unit body 150. The projection portions 174 are disposed radially inside the front right and front left screw hole portions 168. The projection portions 174 protrude radially inward with respect to the terminal unit body 150.

A rib 176 is formed on the inner surface of the terminal unit body 150. The rib 176 is disposed between the front and front right screw hole portions 168, and protrudes radially inward therefrom.

A relief portion 178 is formed on the inner surface of the terminal unit body 150. The relief portion 178 is disposed in adjacent to the front right screw hole portion 168, and is recessed radially outward therefrom.

Protrusions 179 are formed on front right, front left, rear right and rear left portions of the terminal unit body 150, respectively. Each protrusion 179 protrudes radially outward therefrom in a U-shape.

The first sheet metal member 152a has a semicircular-arc shape, in other words, a C-shape as seen from below.

Fusing terminals 180 are disposed on the front end and the rear edge of the first sheet metal member 152, respectively, and protrude upward therefrom. Each fusing terminal 180 has a folded portion and a tip portion extending from the folded portion. In an initial state (before fusing), the tip portion is opened upward with respect to the folded portion. It should be noted that in FIGS. 3-8 and 11-13, the fusing terminals 180 are in the initial state.

A connection tab 182 is formed on the rear end of the first sheet metal member 152a. The connection tab 182 protrudes rearward therefrom and includes a connection hole.

A protrusion tab 184 and a detour portion 186 are formed on the front right portion of the first sheet metal member 152a. The protrusion tab 184 protrudes radially outward therefrom, whereas the detour portion 186 detours radially outward in a protuberant shape.

The second sheet metal member 152b has a U-shape as seen from below. Similarly to the first sheet metal member 152a, the second sheet metal member 152b includes fusing terminals 180 formed on the right and left ends thereof, a connection tab 182 formed on the rear portion thereof, and protrusion tabs 184 formed on the rear right and rear left portions thereof.

The third sheet metal member 152c has an inverted C-shape as seen from below. Likewise, the third sheet metal member 152c includes fusing terminals 180 formed on the front end and the rear edge thereof, a connection tab 182 formed on the rear portion thereof, and protrusion tabs 184 formed on the front left and rear left portions thereof.

The front-side fusing terminal 180 of the third sheet metal member 152c is disposed rightward of the front-side fusing terminal 180 of the first sheet metal member 152a. As seen from below, the first and third sheet metal members 152a and 152c partially overlap, albeit in a non-contact state.

Likewise, the right portion of the second sheet metal member 152b and the lower portion of the first sheet metal member 152a also overlap. Likewise, the left portion of the second sheet metal member 152b and the lower portion of the third sheet metal member 152c also overlap.

Similarly to the stator core assembly 110, the terminal unit 114 is formed by integrally assembling the terminal unit body 150 and the first to third sheet metal members 152a, 152b and 152c.

The first to third sheet metal members 152a, 152b and 152c are aligned in the up-and-down direction, which is the thickness direction thereof, without making contact with each other, while being disposed in concentric circular-arc arrangement.

In integral assemblage, the protrusions 179 and the protrusion tabs 184 corresponding thereto are fitted to each other, whereby positioning is made for the terminal unit body 150 and the first to third sheet metal members 152a, 152b and 152c. Each protrusion tab 184 is exposed in part without being covered with the corresponding protrusion 179. It should be noted that the left-side protrusion tab 184 of the second sheet metal member 152b is fitted to the pin portion 170 without being exposed.

The relief portion 178 and the detour portion 186 are fitted to each other.

The fusing terminals 180 and the connection tabs 182 of the first to third sheet metal members 152a, 152b and 152c protrude from the terminal unit body 150. The connection tabs 182 are partitioned off by the partitions 162, and cover the screw bosses 166 corresponding thereto. The connection part base 160, the screw bosses 166 and the connection tabs 182 form a stator-side connection part 187.

The screw hole portions 168 are fitted onto the screw boss portions 138 corresponding thereto, and then, screws 188 are inserted into pairs of the screw hole portion 168 and the screw boss portion 138, respectively. Accordingly, the terminal unit 114 is attached to the lower side of the insulator 122.

At this time, tips 170a of the pin portions 170 of the terminal unit 114 are inserted into the outer grooves 131 corresponding thereto on the stator core 120, whereby the terminal unit 114 is reliably positioned with respect to the stator core assembly 110.

Each fusing terminal 180 in the initial state is inserted between the first protrusion 142 and the second protrusion 144 of the fusing terminal slot 140 corresponding thereto, whereby the bridge line portion 149a connecting the coils 112 is enclosed by each fusing terminal 180. Each fusing terminal 180 is then closed, and clamps the bridge line portion 149a. When heated by electrification or so forth under the condition, each fusing terminal 180 and the bridge line portion 149a are welded by thermal swaging (fusing). Consequently, a circuit of the coils 112 is formed except for power supply lines 198 (to be described) and the controller 32 or the battery packs 37.

The inside protruding portion (the lowermost portion of the insulator 122) of the second protrusion 144 does not protrude across the lower surface of the terminal unit 114 to which the insulator 122 is attached.

The stator-side connection part 187 is disposed below the connection part guard 136 of the insulator 122.

A power supply line-side connection part 190 is detachably connected to the stator-side connection part 187.

The power supply line-side connection part 190 includes a connection part base 192, a jaw portion 194, three terminal plates 196 and the ends of three power supply lines 198. The connection part base 192 extends up, down, right and left. The jaw portion 194 protrudes from the front portion of the connection part base 192 in a Γ-shape as seen in a side view. The terminal plates 196 are raised from the lower portion of the jaw portion 194 in parallel to the upper surface of the jaw portion 194, while each being exposed at the tip having a hole. The power supply lines 198 are connected to the terminal plates 196 corresponding thereto.

The power supply lines 198, corresponding to the terminal plates 196 respectively, are interposed between the front portion of the connection part base 192 and the rear portion of the jaw portion 194. A portion of each power supply line 198, protruding upward from the interposed position, is formed as a core wire exposed portion by removing the sheath therefrom. The core wire exposed portion and the end of the terminal plate 196 corresponding to each power supply line 198 are bonded to each other, whereby each power supply line 198 and the terminal plate 196 corresponding thereto are connected behind the connection part guard 136. The power supply lines 198 extend downward and reach the controller 32. In other words, the power supply lines 198 downwardly extend in adjacent to the terminal unit 114.

The terminal plates 196 make contact with the connection tabs 182 corresponding thereto, and screws 200 are inserted into pairs of the hole of the terminal plate 196 and the connection hole of the connection tab 182, respectively. Accordingly, the power supply line-side connection part 190 is connected to the stator-side connection part 187. The screws 200 are also inserted into the screw bosses 166 corresponding thereto. The partitions 162 are inserted between the terminal plates 196 aligned right and left. The jaw portion 194 and the terminal plates 196 cover the upper and rear sides of the cup portions 164 of the connection part base 160 and the lower side of the connection tabs 182.

With this connection, the circuit of the coils 112 is formed, including the power supply lines 198, the controller 32 and so forth.

By removing the screws 200, the power supply line-side connection part 190 and the power supply lines 198 are detachable from the stator-side connection part 187 of the terminal unit 114 in a reconnectable manner.

The sensor board 116 has a ring or donut shape and an outer diameter that enables itself to be disposed radially inside the inner hole of the terminal unit body 150.

A plurality of (three) rotation detection elements (not shown in the drawings) are mounted to the sensor board 116 so as to detect the position of the permanent magnet 92 of the rotor 14 and output a rotation detection signal.

The sensor board 116 includes three notches 210, formed radially inward on the outer peripheral portion thereof, and one rib receiver 212. The notches 210 are disposed in correspondence with the screw boss portions 172, respectively. The rib receiver 212 is disposed in correspondence with the rib 176.

The sensor board 116 includes pin holes 214 formed right and left in the front portion thereof. The pin holes 214 are disposed in correspondence with the projections of the projection portions 174, respectively.

The rear side of the sensor board 116 is made in the shape of a straight line extending in the right-and-left direction. A plurality of signal lines (not shown in the drawings) are connected to the inside of the rear side of the sensor board 116 through a connector (not shown in the drawings) so as to transmit the rotation detection signal outputted from one of the rotation detection elements. By disconnecting the connector, the signal lines are disconnected from the sensor board 116 in a reconnectable manner.

Each screw boss portion 172 is inserted at a tubular part about the screw hole thereof into the notch 210 corresponding thereto, whereas the rib 176 is inserted into the rib receiver 212. Accordingly, the sensor board 116 is positioned radially inside the inner hole of the terminal unit 114.

Each projection portion 174 is inserted at the projection thereof into the pin hole 214 corresponding thereto. Accordingly, the sensor board 116 is positioned with respect to the terminal unit 114.

The screw boss portions 172, the rib 176 and the projection portions 174 function as guide portions for directing the sensor board 116 to the attachment position thereof, respectively.

The board presser member 118 is a ring-shaped insulating member made of resin.

The board presser member 118 includes screw hole portions 220, a rib receiver 222, pin holes 224 and a bridge portion 226. The screw hole portions 220, each including a screw hole, are disposed similarly to the notches 210. The rib receiver 222 is formed similarly to the rib receiver 212. The pin holes 224 are disposed similarly to the pin holes 214. The bridge portion 226 is formed on the rear portion of the board presser member 118 so as to be embossed downward and forward.

The outer peripheral portion of the board presser member 118, the outer peripheral portions of the screw hole portions 220, and the both right and left sides of the bridge portion 226 downwardly protrude in a cylindrical or plate shape with respect to the board presser member 118. Accordingly, the board presser member 118, the screw hole portions 220 and the bridge portion 226 are reinforced or formed.

The rib 176 is inserted into the rib receiver 222, and the projection portions 174 are inserted at the projections thereof into the pin holes 224 corresponding thereto. Accordingly, the board presser member 118 is positioned on the lower side of the sensor board 116, while being positioned radially inside the terminal unit 114.

In this condition, screws 228 are inserted into the screw holes of the screw hole portions 220 and those of the screw boss portions 172, respectively, so as to attach the board presser member 118 to the terminal unit 114. Accordingly, the sensor board 116 is attached to the terminal unit 114 so as to be immovable relatively thereto, while being interposed and pressed between the board presser member 118 and the terminal unit 114. When the board presser member 118 is removed by unscrewing the screws 228, even if it is difficult to separate the stator core assembly 110 and the terminal unit 114 from each other after fusing the fusing terminals 180, the sensor board 116 is detachable in a reinstallable manner. Attachment/detachment can be easily made for the sensor board 116 and the board presser member 118 by operating portions, which are not in contact with the terminal unit 114, at the relief portion 178 of the terminal unit body 150.

The bridge portion 226 is remote from the lower surface of the sensor board 116 and the inner peripheral surface of the terminal unit body 150. The signal lines, detachably connected to the sensor board 116, are directed toward the controller 32 while being guided downward by the bridge portion 226. In other words, the signal lines adjacent to the sensor board 116 extend downward.

Next, an exemplary motion of the hammer drill 1 according to the embodiment will be explained.

When a worker pushes the trigger 28 into the handle housing 22, the plunger 26 is pushed down and the switch 24 is turned on, whereby an on signal is transmitted to the controller 32.

When receiving the on signal, the controller 32 causes the microcomputer to obtain a rotation detection signal of the sensor circuit board 116 through a relevant one of the signal lines so as to obtain the rotational state of the rotor 14. Additionally, the controller 32 controls on/off of the switching elements in accordance with the obtained rotational state and sequentially applies excitation current to the coils 112 of phases U, V and W in the stator 12 so as to rotate the rotor 14. The switch 24 transmits a signal to the controller 32 in accordance with the pushed amount of the plunger 26. The controller 32 controls the rotor 14 to rotate at a speed in accordance with the pushed amount (e.g., at a greater speed with increase in pushed amount).

The motor shaft 16 is rotated in conjunction with the rotation of the rotor 14, and the rotation thereof is reduced and transmitted to the intermediate shaft 50 through the gear 52. The bevel teeth 58 of the intermediate shaft 50 is reduced in rotation through the bevel gear 59, and rotates the tool holder 8 about the center axis extending in the back-and-forth direction, whereby a rotational force is applied to the tool socket attached to the tool socket holding portion 7. With the power transmission mechanism 44 and so forth generating the aforementioned rotational force, the hammer drill 1 performs a drill motion of processing a workpiece with the rotational force.

On the other hand, the rotation of the motor shaft 16 is reduced and transmitted to the crankshaft 60 through the gear 62.

The crank pin 72 reciprocates the piston 66 back and forth inside the cylinder 74 through the connecting rod 64. Accordingly, the air inside the air chamber 80 acts as an elastic element, whereby the striker 82 is reciprocated back and forth. The striker 82 consecutively collides with the impact bolt 9 by the reciprocating motion thereof. The impact of the collision is transmitted to the tool socket attached to the tool socket holding portion 7, whereby a striking force is generated in the back-and-forth direction. With the impact mechanism 44 and so forth that generates the striking force, the hammer drill 1 performs a hammer motion of striking the workpiece.

The centrifugal fan 106 is rotated in conjunction with the rotation of the motor shaft 16, whereby air is sucked into the housing 2 through an intake port (not shown in the drawings). The air passes through the outside of the stator 12 and the inside of the stator 12 (the space between the stator 12 and the rotor 14), and is then discharged from an exhaust port (not shown in the drawings) formed in the motor housing 20 at a position lateral to the centrifugal fan 106, whereby the brushless motor 10 is cooled.

While passing through the inside of the stator 12, the air passes through the inside of the stator core assembly 110, that of the terminal unit 114, that of the sensor board 116 and that of the board presser member 118, whereby the coils 112 are effectively cooled by the air passing through the slots and the surroundings thereof.

Next, advantageous effects of the hammer drill 1 according to the embodiment will be explained.

The hammer drill 1 includes the plural coils 112, the stator 12 holding the plural coils 112, the rotor 14 that is rotatable with respect to the stator 12, and the terminal unit 114 including the plural fusing terminals 180 electrically connected to the plural coils 112. Therefore, flexibility in layout of the fusing terminals 180 is herein higher than when the insulator 122 is provided with the fusing terminals 180. Therefore, the hammer drill 1 easily deals with increase in number of the coils 112, a relatively complex circuit configuration such as 2s2p (two-series two-parallel) delta connection, and so forth.

Furthermore, the hammer drill 1 includes the power supply lines 198 connected to the terminal unit 114. Therefore, connection of the power supply lines 198 is made easy, whereby the hammer drill 1 exhibits good assembling performance.

In another aspect, the hammer drill 1 includes the plural coils 112, the insulator 122 holding the plural coils 112, the stator core 120 holding the insulator 122, the rotor 14 that is rotatable with respect to the stator core 120, and the terminal unit 114 that is electrically connected to the plural coils 112 and is engaged with the stator core 120. Therefore, flexibility in structure of electrically connecting the coils 112 is high, whereby the hammer drill 1 easily deals with increase in number of the coils 112 and so forth. Additionally, the terminal unit 114 is engaged with the robust stator core 120, whereby the positional precision of the terminal unit 114 with respect to the stator core 120 is enhanced. Moreover, when the sensor board 116 is mounted to the terminal unit 114, the positional precision of the sensor board 116 (the rotation detection elements) with respect to the rotor 14 (the permanent magnet 92) is enhanced.

Furthermore, the terminal unit 114 is fixed to the insulator 122 by the screws 188. Therefore, attachment of the terminal unit 114 is made easy.

In yet another aspect, the hammer drill 1 includes the plural coils 112, the insulator 122 holding the plural coils 112, the stator core 120 holding the insulator 122, the rotor 14 that is rotatable with respect to the stator core 120, the terminal unit 114 electrically connected to the plural coils 112, and the power supply lines 198 that supply electric power to the plural coils 112 and are detachably connected to the terminal unit 114. Therefore, flexibility in structure of electrically connecting the coils 112 is high, whereby the hammer drill 1 easily deals with increase in number of the coils 112 and so forth. Additionally, when either of the motor 10 and the controller 32 has a trouble or requires inspection, the relevant one can be separately taken out by detaching the power supply lines 198 from the terminal unit 114. Thus, reduction is made for time-consuming effort and cost required in repair, replacement or inspection.

Furthermore, the power supply lines 198 are fixed to the terminal unit 114 by the screws 200. Therefore, connection of the power supply lines 198 can be made easy in a detachable manner.

Furthermore, the hammer drill 1 includes three power supply lines 198. The power supply lines 198 include the terminal plates 196, respectively, and are connected to the terminal unit 114 through the terminal plates 196. The terminal unit 114 includes the stator-side connection part 187 to which the power supply lines 198 are connected. The stator-side connection part 187 includes two partitions 162 partitioning off the terminal plates 196. Therefore, the power supply lines 198 are easily, appropriately and detachably connected to the stator-side connection part 187.

Furthermore, the terminal unit 114 includes the pin portions 170 protruding toward the stator core 120. The stator core 120 includes the outer grooves 131 as engaged portions with which the pin portions 170 are engaged. The pin portions 170 are engaged with the outer grooves 131 of the stator core 120. Therefore, the terminal unit 114 is engaged with the insulator 122 made of resin and the stator core 120 made of metal, whereby minute movement or change in posture of the terminal unit 114 can be prevented from being caused by sagging of the insulator 122. Consequently, the positional precision of the terminal unit 114 with respect to the stator core 120 is enhanced, and that of the sensor board 116 (the rotation detection elements) with respect to the rotor 14 (the permanent magnet 92) is enhanced.

Furthermore, the hammer drill 1 includes the sensor board 116 and the signal lines. The sensor board 116 includes the rotation detection elements, each of which outputs a rotation detection signal when detecting rotation of the rotor 14. The sensor board 116 is attached to at least one of the terminal unit 114 and the insulator 122. The signal lines are connected to the sensor board 116, and each transmits the rotation detection signal. The signal lines adjacent to the sensor board 116 extend in the same (downward) direction as the power supply lines 198 adjacent to the terminal unit 114. Therefore, wiring of the signal lines and the power supply lines 198 are made easy.

In further yet another aspect, the hammer drill 1 includes the plural coils 112, the insulator 122 holding the plural coils 112, the terminal unit 114 that is electrically connected to the plural coils 112 and is attached to the insulator 122, the rotor 14 that is rotatable with respect to the insulator 122, and the sensor board 116 that detects rotation of the rotor 14 and is attached to the terminal unit 114. The sensor board 116 is detachable from the terminal unit 114, while the terminal unit 114 is attached to the insulator 122. Therefore, the sensor board 116 is detachable without detaching the terminal unit 114. Because of this, repair, replacement or inspection of the sensor board 116 is made easy, and reduction is made for time-consuming effort and cost required in trouble, inspection or so forth related to the motor 10.

In still further yet another aspect, the hammer drill 1 includes the plural coils 112, the insulator 122 holding the plural coils 112, the terminal unit 114 that is electrically connected to the plural coils 112 and is attached to the insulator 122, the rotor 14 that is rotatable with respect to the insulator 122, and the sensor board 116 that detects rotation of the rotor 14. The sensor board 116 is attached to at least one of the insulator 122 and the terminal unit 114 integrally attached to the insulator 122. In other words, attachment of the sensor board 116 is made after attachment of the terminal unit 114 is made. Therefore, the sensor board 116 is detachable without detaching the terminal unit 114. Because of this, repair, replacement or inspection of the sensor board 116 is made easy, and reduction is made for time-consuming effort and cost required in trouble, inspection or so forth related to the motor 10.

Furthermore, the hammer drill 1 includes the board presser member 118, which is made of resin, for attachment of the sensor board 116. Therefore, attachment of the sensor board 116 is reliably made without being affected by electric actuation. Additionally, detachment of the sensor board 116 is made by removing the screws 228 and the board presser member 118.

Furthermore, the terminal unit 114 includes the guide portions (the screw boss portions 172, the rib 176 and the projection portions 174) directing the sensor board 116 to the attachment position thereof. Therefore, the sensor board 116 is reliably attached to a desired position, and the positional precision of the rotation detection elements with respect to the permanent magnet 92 is enhanced. Because of this, the rotation of the rotor 14 is precisely detected and is controlled as reliably as possible, whereby the rotation of the rotor 14 is stabilized as much as possible.

Furthermore, the terminal unit 114 is made in the shape of a ring including the inner hole. The sensor board 116 is disposed inside the inner hole of the terminal unit 114. Therefore, the terminal unit 114 and the sensor board 116 overlaps in the axial direction of the motor shaft 16, whereby the motor 10 is shorted by that much and is made as compact as possible.

In still further yet another aspect, the hammer drill 1 includes the plural coils 112, the stator core 120, the insulator 122 integrally molded with the stator core 120, the insulator 122 holding the plural coils 112, and the rotor 14 that is rotatable with respect to the stator core 120. Therefore, unlike a hammer drill including a front insulator and a rear insulator provided separately from the front insulator, the hammer drill 1 does not require an overlapping portion for reliably producing insulating distance, whereby a large output can be produced with large coils 112 or the hammer drill 1 can be made compact while a required output is maintained. Additionally, the stator core assembly 110 is obtained by fixing the stator core 120 to the insulator 122 by integral molding. Thus, the motor 10 exhibits good assembling performance. Moreover, the insulator 122 is enhanced in robustness by integral molding. When the insulator 122 is provided with the screw boss portions (attachment portions) 172 and the fusing terminal slots (receiver portions) 140 of the terminal unit 114, the attachment portions and the receiver portions are enhanced in strength.

Moreover, the stator core 120 includes the plural teeth 130 holding the coils 112, and the insulator 122 includes the tooth coating portions 132 each coating each of the plural teeth 130 except for the tip portion thereof. Therefore, the teeth 130 holding the coils 112 are coated with the integrally molded tooth coating portions 132, respectively, whereby the hammer drill 1 is made compact while a required output is reliably produced, and exhibits good assembling performance and good robustness.

Furthermore, the insulator 122 is disposed in continuous form. Therefore, the insulator 122 is compactly disposed with respect to the stator core 120. Additionally, the insulator 122 extends in continuous form to the inside, the upper side and the lower side of the stator core 120, whereby the insulator 122 is robustly attached to the stator core 120, and the attachment portions and the receiver portions of the insulator 122 also become robust.

In still further yet another aspect, the hammer drill 1 includes the stator core 120 including the plural teeth 130 aligned in the circumferential direction, the rotor 14 that is rotatable with respect to the stator core 120, the insulator 122 that is held by the stator core 120 and includes the plural tooth coating portions 132 covering the plural teeth 130 and the protrusion end 146 corresponding to one of the plural tooth coating portions 132, the plural coils 112 wound about the plural tooth coating portions 132, respectively, and the coil connecting conductive wire (the bridge line portion 149a, the turn portion 149b, the oblique introduction portion 149c) electrically connecting two of the plural coils 112. In the hammer drill 1, one surface F of the one tooth coating portion 132 and the protrusion end 146 corresponding to the one tooth coating portion 132 are displaced from each other in the circumferential direction, and the coil connecting conductive wire (the turn portion 149b) is hooked on the protrusion end 146 and is introduced to the surface F of the one tooth coating portion 132. Therefore, a portion (the oblique introduction portion 149c) of the conductive wire is introduced obliquely to the up-and-down direction from the protrusion end 146 to the surface F and is hung on the surface F, whereby it made easier to appropriately fix the conductive wire to the surface F than when the conductive wire is introduced in the up-and-down direction. When the conductive wire introduced to the tooth coating portion 132 is correctly fixed, the first of the windings of the conductive wire is appropriately formed on the tooth coating portion 132. Because of this, each of the second and subsequent windings is appropriately formed in the same way as the preceding winding thereof, the coil 112 is appropriately formed as the windings wound about the tooth coating portion 132.

Furthermore, the insulator 122 is integrally molded with the stator core 120. Therefore, the protrusion end 146 is formed as robustly as possible, and in forming the turn portion 149b, such a situation is prevented that the protrusion end 146 sags by the conductive wire pressed thereon and the conductive wire is displaced.

Furthermore, the protrusion end 146 includes the end side of the extension portion 145 of the second protrusion 144 that forms the fusing terminal slot 140 and protrudes on the insulator 122. Additionally, the protrusion end 146 includes the end side of the recess 147 recessed on the insulator 122. Therefore, the protrusion end 146 is simply and effectively formed.

Furthermore, the one tooth coating portion 132 includes the grooves 135 on which the coil connecting conductive wire (the end of the oblique introduction portion 149c) is hooked. Therefore, the oblique introduction portion 149c is introduced as reliably as possible to an appropriate position on the one tooth coating portion 132.

Furthermore, half of the coils 112 and half of the coil connecting conductive wire are formed by the continuous conductive wire. Therefore, electrically joined portions are reduced in number, whereby a circuit of the coils 112 is provided that has a simple configuration and good electric properties.

Still furthermore, the hammer drill 1 includes the terminal unit 114 including the plural fusing terminals 180 electrically connected to the plural coils 112. The insulator 122 includes the fusing terminal slots 140 into which the fusing terminals 180 are inserted, and the protrusion end 146 and the fusing terminal slot 140 corresponding thereto continue to each other. Therefore, the protrusion end 146 for correct introduction of the conductive wire and the corresponding fusing terminal slot 140 enclosing the fusing terminal 180 are easily and compactly formed as a common portion.

It should be noted that the present invention is not limited to the aforementioned embodiment, and for instance, the following changes are made on an as-needed basis.

The motor may be another type of motor such as a brushed motor. Additionally or alternatively, the motor may be an AC (alternating current) motor instead of a DC (direct current charging type) motor.

The housing may be obtained by integrating at least any two of the motor housing, the output housing, the handle housing and the lower housing, or alternatively, at least any of these housings may be further divided.

Detachable connection of the plural power supply lines may be separately made without bundling the plural power supply lines at the connection part base and the jaw portion of the common power supply line side connection part. Additionally, detachable connection of the power supply lines may be made with pawls (connecting protruding portions) and pawl receivers (connected portions) instead of or together with the screws.

The sensor board may be attached not to the terminal unit but to the insulator. Alternatively, the sensor board may be attached to both the terminal unit and the insulator.

The insulator may be divided.

The guide portions may be any one or two types of portions including the screw boss portions, the rib and the protruding portions, or alternatively, may include another type of portion in addition to the portions.

Either the protrusion end of the extension portion of the second protrusion or the recess may be omitted. When the protrusion end of the extension portion of the second protrusion is omitted, one of two portions raised upright from the both sides of the bottom of the recess is provided as the protrusion end on which the conductive wire is hooked.

The coil-related conductive wires may be wound reversely to the winding direction in the embodiment, and the protrusion end and the recess, on which the conductive wire is hooked, may be disposed on a side (first protrusion side) circumferentially opposite to the side in the embodiment.

At least any of the types of line including the power supply lines, the coil-related conductive wires, the signal lines and the other lead wires may be obtained by electrically connecting a plurality of short lines. For example, the coil connecting conductive wires may be provided separately from the coils as lead wires, and may be electrically connected to each other.

The insulator may be made of paper. The number of intermediate shafts and the number of gears are not particularly limited. The hammer drill 1 may be provided with a power supply cord instead of the battery attachment portion, and may be driven by a commercial power supply. One of the mechanism for drill motion and the mechanism for hammer motion may be omitted. The number of coils, the number of fusing terminals and the number of power supply lines are not particularly limited. The grooves for guiding the conductive wire of the coils may be provided to extend one turn about the root of each tooth coating portion. The grooves may be reduced in number and/or in length. The number of each type of screw, the number of each type of screw hole, and so forth are not particularly limited. The number of the projection portions and the number of holes in the terminal unit are not particularly limited. The number of the engaging portions (pin portions) in the terminal unit and the number of the engaged portions (outer grooves) corresponding to the engaging portions in the stator core are not particularly limited. Each pair of the engaging portion and the engaged portion may be engaged by inserting a rib between a pair of protrusions, whereas the other engaging portions, connection parts, screwing portions, holding portion and attachment portions may be changed to those having other structures and forms. The number, layout, installation or non-installation, material, structure, form and so forth of a variety of members and portions may be arbitrarily changed.

Furthermore, the present invention may be applied to another type of hammer drill, another type of power tool and so forth such as high power products including a large chain saw, a lawn mower, a large blower, a large grinder and so forth.

REFERENCE SIGNS LIST

1 Hammer drill (power tool)
10 Motor
12 Stator
14 Rotor
32 Controller
92 Permanent magnet
110 Stator core assembly
112 Coil
114 Terminal unit
116 Sensor board
118 Board presser member
120 Stator core
122 Insulator
130 Tooth
131 Outer groove (engaged portion)
132 Tooth coating portion
135 Groove
140 Fusing terminal slot
144 Second protrusion
145 Extension portion
146 Protrusion end
147 Recess
149a Bridge line portion (coil connecting conductive wire)
149b Turn portion (coil connecting conductive wire)
149c Oblique introduction portion (coil connecting conductive wire)
162 Partition
170 Pin portion (engaging portion)
172 Screw boss portion (guide portion)
174 Projection portion (guide portion)
176 Rib (guide portion)
180 Fusing terminal
187 Stator-side connection part (of power supply line)
188, 200, 228 Screw
190 Power supply line-side connection part
196 Terminal plate
198 Power supply line
F Surface (of tooth coating portion)

What is claimed is:

1. A power tool comprising:
    a plurality of coils;
    an insulator holding the plurality of coils;
    a terminal electrically connected to the plurality of coils, the terminal having a ring shape with an inner hole, and the terminal being attached to the insulator;
    a rotor rotatable with respect to the insulator; and
    a sensor board configured to detect a rotation of the rotor the sensor board being disposed inside the inner hole of the terminal, the sensor board being detachably attached to the terminal by a plurality of screws such that when the sensor board is detached from the terminal the terminal remains attached to the insulator.

2. The power tool according to claim 1, further comprising a board presser member configured to press the sensor board against the terminal, the board presser member being made of resin.

3. The power tool according to claim 2, wherein the terminal includes a guide portion directing the sensor board to an attachment position.

4. The power tool according to claim 1, wherein the terminal includes a guide portion directing the sensor board to an attachment position.

5. A power tool comprising:
    a plurality of coils;
    an insulator holding the plurality of coils;
    a terminal electrically connected to the plurality of coils, the terminal being attached to the insulator and including:
        a terminal body made of resin, the terminal body having an inner hole, and
        a plurality of conductive sheet metal members;
    a rotor rotatable with respect to the insulator; and
    a sensor board configured to detect a rotation of the rotor, the sensor board being attached to at least one of (i) the insulator, and (ii) the terminal, which is integrally attached to the insulator, the sensor board being located radially inside of the conductive sheet metal members.

6. The power tool according to claim 5, further comprising a board presser member configured to attach the sensor board to the terminal, the board presser member being made of resin.

7. The power tool according to claim 6, wherein:
    the terminal has a ring shape with an inner hole, and
    the sensor board is disposed inside the inner hole of the terminal.

8. The power tool according to claim 5, wherein the terminal includes a guide portion directing the sensor board to an attachment position.

9. The power tool according to claim 8, wherein:
the terminal has a ring shape with an inner hole, and
the sensor board is disposed inside the inner hole of the terminal.

10. The power tool according to claim 5, wherein:
the terminal has a ring shape with an inner hole, and
the sensor board is disposed inside the inner hole of the terminal.

\* \* \* \* \*